United States Patent
Fujiwara et al.

[11] Patent Number: 5,905,559
[45] Date of Patent: May 18, 1999

[54] LIQUID CRYSTAL DISPLAY APPARATUS AND PRODUCING METHOD THEREOF

[75] Inventors: Sayuri Fujiwara, Nara; Yoshihiro Izumi, Kashihara; Tokihiko Shinomiya, Nara; Kenji Majima, Matsubara, all of Japan

[73] Assignee: Sharp Kabushiki Kaisha, Osaka, Japan

[21] Appl. No.: 09/097,539

[22] Filed: Jun. 15, 1998

Related U.S. Application Data

[62] Division of application No. 08/521,470, Aug. 30, 1995, Pat. No. 5,808,719.

[30] Foreign Application Priority Data

Sep. 2, 1994 [JP] Japan .................................. 6-210217

[51] Int. Cl.$^6$ ...................... G02F 1/1339; G02F 1/1333; C30B 33/00
[52] U.S. Cl. .......................... 349/190; 349/153; 349/110; 216/23
[58] Field of Search .................... 349/153, 190, 349/110

[56] References Cited

U.S. PATENT DOCUMENTS

| | | | |
|---|---|---|---|
| 3,603,984 | 9/1971 | Heilmeier | 349/73 |
| 4,362,771 | 12/1982 | Umeda et al. | 349/157 |
| 4,832,457 | 5/1989 | Saitoh et al. | 349/73 |
| 4,980,774 | 12/1990 | Brody | 349/55 |
| 5,268,778 | 12/1993 | Shioji et al. | 349/110 |
| 5,305,154 | 4/1994 | Sumi et al. | 349/110 |
| 5,315,101 | 5/1994 | Hughes et al. | 250/208 |
| 5,367,390 | 11/1994 | Scheffer et al. | 349/111 |
| 5,379,139 | 1/1995 | Sato et al. | 349/155 |
| 5,576,859 | 11/1996 | Castleberry | 349/110 |
| 5,633,739 | 5/1997 | Matsuyama et al. | 349/106 |

FOREIGN PATENT DOCUMENTS

| | | |
|---|---|---|
| 62-008 771 | 2/1987 | Japan . |
| 1-213 621 | 8/1989 | Japan . |
| 3-256025 | 11/1991 | Japan . |
| 60-102613 | 6/1995 | Japan . |

OTHER PUBLICATIONS

English–language abstract of Japanese Patent Publication No. 1–213621–A/1989.

*Primary Examiner*—William L. Sikes
*Assistant Examiner*—Tarifur R. Chowdhury
*Attorney, Agent, or Firm*—David G. Conlin; George W. Neuner

[57] ABSTRACT

A liquid crystal display apparatus has a junction panel obtained by joining a plurality of liquid crystal display panels so that display surfaces of the liquid crystal display panels become flush. The liquid crystal display panels each have picture elements for displaying images by transmitting and shielding a transmitting light, a black matrix for shielding a light which enters a position where the picture elements do not exist and a zonal sealing member for sealing liquid crystal into each picture element. A width of the sealing member on the junction surface where the liquid crystal display panels are joined is set so as to be narrower than a width of the black matrix. Joints of displayed images on a border of the liquid crystal display panels of the junction panel can be made inconspicuous, and quality of displayed images on the junction panel which is a big screen can be improved.

6 Claims, 19 Drawing Sheets

F I G. 1
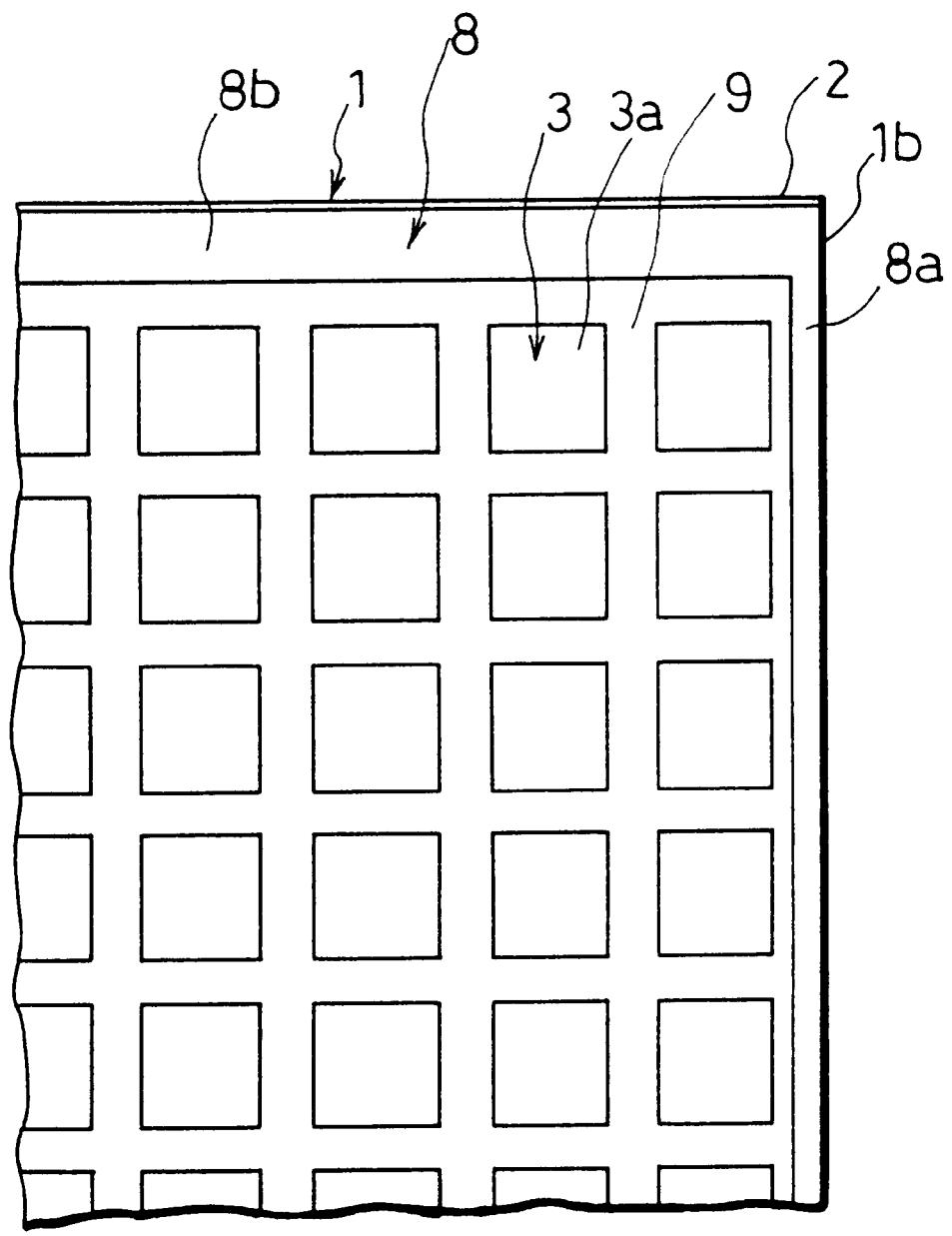

F I G. 13
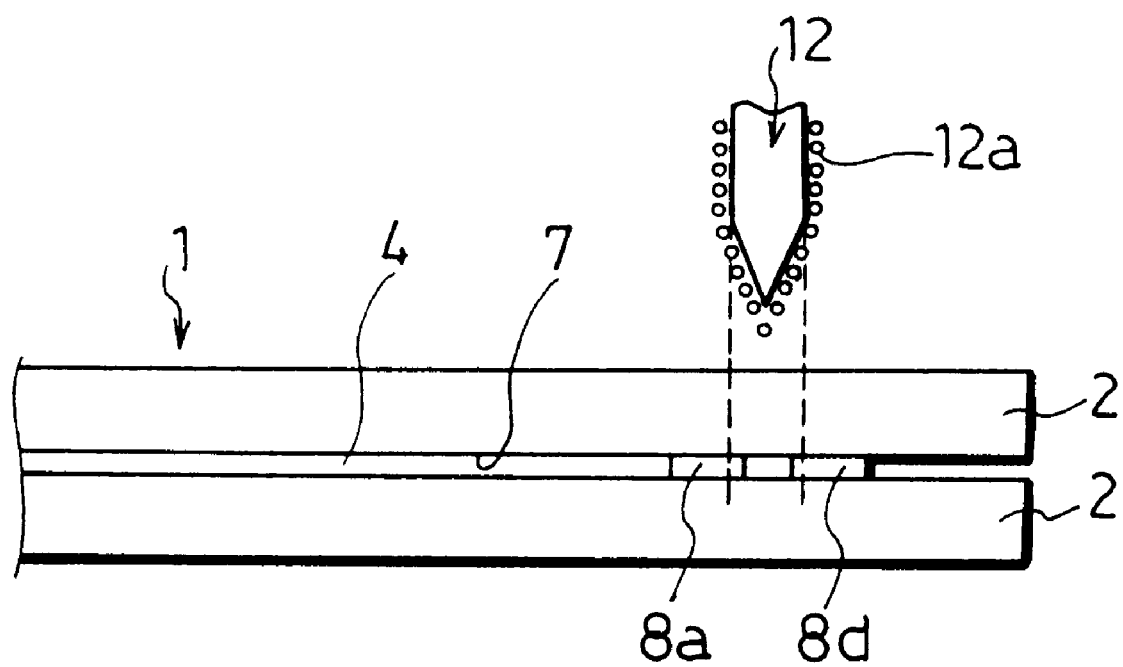

LIQUID CRYSTAL DISPLAY APPARATUS AND PRODUCING METHOD THEREOF

This application is a division of application Ser. No. 08/521,470, filed on Aug. 30, 1995, and now U.S. Pat. No. 5,808,719.

FIELD OF THE INVENTION

The present invention relates to a liquid crystal display apparatus which is capable of displaying an image on a large screen by joining a plurality of liquid crystal display elements and to its producing method.

BACKGROUND OF THE INVENTION

Conventionally, in order to display an image on a large screen by a liquid crystal display apparatus, a junction unit has been formed by joining a plurality of liquid crystal modules as a liquid crystal display element so that one image has been displayed by using the junction unit.

As to methods for joining such a junction unit, a method for joining a plurality of liquid crystal modules which is arranged such that a liquid crystal is injected between at least two substrates (Japanese Examined Patent Publication No. 62-8771/1987 (Tokukosho 62-8771)) as a first method, and a method which uses a plurality of substrates, which are joined to one another, on one side and which uses one substrate with a large area on an opposite side (Japanese Unexamined Patent Publication No. 1-213621/1989 (Tokukaihei 1-213621)) as a second method are suggested.

In the first method, as shown in FIG. 23, a front substrate 41 and a rear substrate 42 which have a rectangular plate-like shape are laminated by applying sealing resin 43 to all three sides of the substrates except for a side to be joined. As a result, an opening is formed on an end of the side to be joined. Here, in order to applying an electric field to liquid crystal 44, an electrode 41a is formed on the front substrate 41 and an electrode (not shown) on the rear substrate 42.

Successively, in the first method, the liquid crystal 44 is injected into gaps among the front substrate 41 and the rear substrate 42 and the sealing resin 43 from the opening, and the opening is temporarily sealed with an adhesive material 46, such as soft solder, epoxy resin, so that liquid crystal modules 45 are produced. Thereafter, the sealed end of each liquid crystal module 45 are deposited on each other so that the junction unit is formed.

Meanwhile, in the second method, as shown in FIG. 24, an adhesive 52 composed of polymeric materials is applied to ends of a pair of substrates 51, on which an electrode and a driving circuit for applying an electric field to liquid crystal are previously formed, and the ends of each substrate 51 are stuck by pressure so as to be joined by the adhesive 52.

A junction distance between ends of each substrate 51 which have been joined in such a manner is approximately 50 μm, so it is set smaller than a size of one picture element of the liquid crystal display apparatus. On the junction end of each substrate 51 which has been joined in such a manner, the adhesive 52 is protruded from the surface of each substrate 51, so this causes irregularities of the gap between the substrates 51 and a counter substrate 53.

Therefore, in the second method, a laser beam 54 is irradiated to the protruded portion of the adhesive 52 so that the protruded portion of the adhesive 52 is removed, and the height of the protruded portion at a junction section between each substrate 51 is lowered to not more than 5 μm. Thereafter, the counter substrate 53 and each substrate 51 are laminated so that a gap for injection of the liquid crystal 55 is formed, and the liquid crystal 55 is injected into the gap so that the liquid crystal display apparatus is produced.

However, in the conventional first method, immediately after the liquid crystal 44 is injected into the gaps, the opening of the gaps is temporarily sealed with the adhesive material 46 so than the liquid crystal modules 45 are produced. Then, the liquid crystal modules 45 are connected to each other, so it is difficult to control a sealing shape and a dimension of its junction section, namely, a shape of the adhesive material 46, thereby, arising a problem that secureness of sufficient sealing adhesive strength by the adhesive material 46 is difficult.

In addition, in the first method, in the case where a width of the junction section is set larger than a pitch of a picture element in order to secure the sufficient sealing adhesive strength, since the pitch of the picture element between the liquid crystal modules 45 changes greatly, images formed by each liquid crystal module 45 become something strange, so the images is difficult to see.

Therefore, in the first method, since the sealing shape of the junction section of the joined liquid crystal modules 45 directly influences quality of displaying, sealing pattern formation with high accuracy and high precision is required, thereby arising a problem that it is troublesome to produce a liquid crystal display apparatus having a large screen.

In addition, in the first method, in the case where epoxy resin is used as the adhesive material 46, a solvent included in the adhesive material 46 is dissolved out, and it may cause deterioration in characteristics of the liquid crystal 44. The deterioration in characteristics of the liquid crystal 44 adversely affects the quality of displaying, namely the quality of displaying is deteriorated.

Meanwhile, in the above-mentioned second method, in order to maintain high image quality, the height of the protruded portion at the junction section between the substrates 51 is lowered to not more than 5 μm, but a special process, such as a laser process is required for removing the height of the protruded portion between the substrates 51. As a result, not only process of production is complicated but also costs of production becomes expensive.

In addition, in the second method, since the liquid crystal 55 is injected into the gap with a large area, not only a large-sized injection unit is required but also it takes much time and trouble to uniformly inject the liquid crystal 55 into the gap.

SUMMARY OF THE INVENTION

It is a first object of the present invention to provide a liquid crystal display apparatus which is capable of saving trouble of producing a large screen while image quality of the large screen is being maintained and to provide its producing method.

In order to achieve the above object, a liquid crystal display apparatus of the present invention includes (1) board-like liquid crystal display elements, which have a plurality of picture elements in a matrix pattern for displaying images by transmitting/blocking a transmitting light according to an image signal, (2) light shielding means, which is provided in a net-like pattern on the liquid crystal display elements so as to surround each picture element for and which blocks a light entering a position where the picture elements do not exist, (3) a zonal sealing member, which is formed along an outer edge section of the liquid crystal display element and which is for sealing liquid crystal into each picture elements and (4) a liquid crystal display element complex arranged by joining the liquid crystal display elements so that display surfaces of the liquid crystal display elements become flesh. In the liquid crystal display apparatus of the present invention, the sealing member is formed such that a width on the junction section where the liquid crystal display elements are joined becomes narrower than a width of the light shielding means.

With the above arrangement, the liquid crystal display element complex is arranged such that a plurality of liquid crystal display elements are joined so that their display surfaces form one surface, and small-sized liquid crystal display elements with high yield can be used, thereby making it possible to easily realize the liquid crystal display element complex having a large screen.

In addition, with the above arrangement, since the width of the sealing member on the junction section of the liquid crystal display elements is formed so as to be narrower than the width of the light shielding means, a sum of widths of each sealing member on the junction section of each liquid crystal display element can be substantially set to a value which is less than twice the width of the light shielding means of each liquid crystal display element.

As a result, since the above arrangement can decrease irregularity of a pitch of the picture elements of the liquid crystal display element complex composed of the joined liquid crystal display elements and reduces strangeness of the images on the junction section displayed on the liquid crystal display element complex, lowering of image quality on the large screen of the liquid crystal display element complex can be restrained and at the same time, it is possible to display images on the large screen.

In order to achieve the above object, the method for producing the liquid crystal display apparatus of the present invention is characterized by including the steps of (1) producing liquid crystal display elements having a plurality of picture elements, which is arranged in a matrix pattern so as to display images by transmitting and by shielding a transmitting light according to an image signal, having net-like light shielding means which surrounds each picture element so as to block a light entering a position where the picture elements do not exist and having a zonal sealing member provided in order to seal liquid crystal between the substrates and (2) joining the plural liquid crystal display elements so that display surfaces of the liquid crystal display elements become flush wherein a width of the sealing member on a junction side formed along a junction surface of the liquid crystal display elements is set narrower than a width of the light shielding means.

With the above method, small-sized liquid crystal display elements with high yield can be used, and the liquid crystal display elements are joined so that their display surfaces form one surface, thereby making it possible to easily realize the liquid crystal display apparatus having the large screen.

In the above method, since each picture element is optically distinguished by the light shielding means, the liquid crystal display apparatus where the quality of images displayed by above each picture element is further made clear by the light shielding means can be obtained.

In the above method, since the width of the sealing member on the junction side is set narrower than the width of the light shielding means, a difference between the sum of the widths of the sealing members on each junction side of the junction section on the joined liquid crystal display elements and the width of the light shielding means can be decreased.

For this reason, in the above method, irregularity of a pitch of the picture elements on the joined liquid crystal display elements can be reduced, strangeness of images on the junction portion displayed on the liquid crystal display elements can be decreased, so lowering of image quality on the large screen of the liquid crystal display elements can be restrained and at the same time, it is possible to stably obtain the liquid crystal display apparatus which is capable of displaying images with excellent quality on the large screen.

For fuller understanding of the nature and advantages of the invention, reference should be made to the ensuing detailed description taken in conjunction with the accompanying drawings.

BRIEF DESCRIPTION OF THE DRAWINGS

FIG. 1 is a constructional drawing of a main section of a liquid crystal display panel in embodiment 1 in the liquid crystal display apparatus of the present invention and its producing method.

FIG. 13 is a constitutional drawing of a main section which shows a method for cutting each substrate of the liquid crystal display panel.

FIG. 24(a) is a front view at the time of joining each substrate; FIG. 24(b) is a front view at the time of smoothing a junction section using a laser beam; and FIG. 24(c) is a front view at the time of sticking a counter substrate to the above substrates and injecting liquid crystal.

DESCRIPTION OF THE EMBODIMENTS

[EMBODIMENT 1]

The following will discuss one embodiment of the present invention as embodiment 1 referring to FIGS. 1 through 18.

Figure 2:
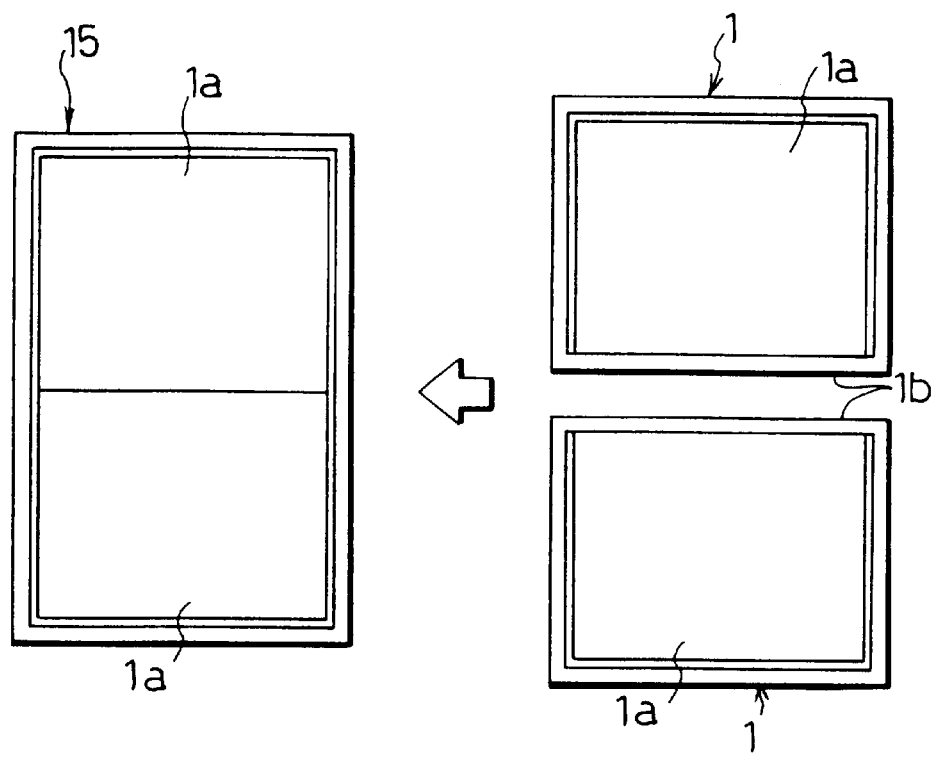
FIG. 2 is an explanatory drawing of a junction panel obtained by joining the two liquid crystal display panels to each other.

As shown in FIG. 2, a liquid crystal display apparatus is provided with a junction panel 15 obtained by joining two liquid crystal display panels 1 so that two display surfaces 1a of each liquid crystal display panel 1 form one surface. The liquid crystal display panel 1 is formed so as to have a rectangular plate-like shape, and it is capable of displaying an image by respectively transmitting and shielding incident lights according to image signals to be inputted.

In such a way, when a plurality of liquid crystal display panels 1 are joined, a small-sized liquid crystal display panel 1 with high yield, such as a liquid crystal display panel of approximately 10 inches, can be used, so it is possible that the junction panel 15 which is capable of displaying an image on a large screen has excellent yield.

Figure 3:
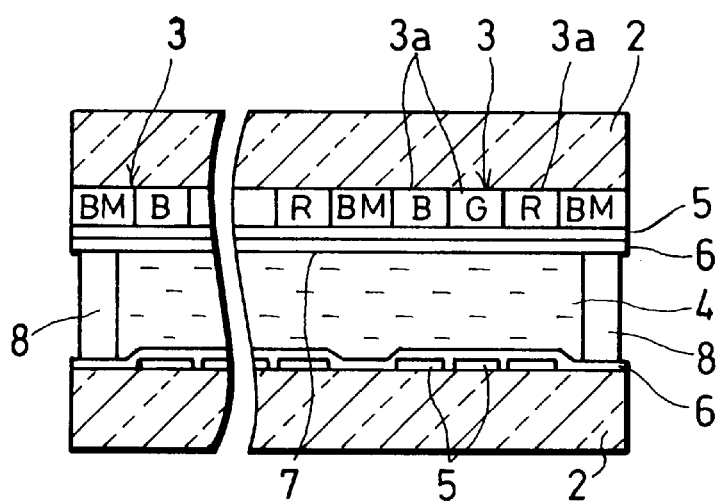
FIG. 3 is a cross section of a main section of the liquid crystal display panel.

First, an arrangement of the liquid crystal display panel 1 will be explained. As shown in FIGS. 1 and 3, in the liquid crystal display panel 1, a TN (Twisted Nematic) normally white-type display mode is used. The liquid crystal display panel 1 is formed such that picture elements 3 whose cross section has a substantially square shape are arranged in a matrix pattern between a pair of transparent substrates 2, such as a rectangular plate-like glass.

Liquid crystal 4 for forming each picture element 3 is sealed between the transparent substrates 2, and a plurality of transparent electrodes 5 for applying an electric field to the liquid crystal 4 are zonally formed on surfaces of the transparent substrates 2 which face each other so as to be parallel to one another. Here, a thickness of the liquid crystal 4 is approximately 5 μm. As a material of the liquid crystal 4, PCH (PhenylCycloHexane) liquid crystal material with extremely low viscosity and with rapid response (for example, made by Merck Co., Inc., ZLI-1565) can be used.

In addition, alignment films 6 for aligning the liquid crystal 4 of each picture element 3 are formed on the surfaces of the transparent substrates 2 which face each other so as to cover the transparent electrodes 5 and the surface of the transparent substrates 2.

In the liquid crystal display panel 1, the transparent substrates 2 are laminated each other by applying sealing members 8 to outer edges of each transparent substrate 2 so that the transparent electrodes 5 face and intersect each other and that an uniform gap 7 is obtained. The liquid crystal 4 is sealed into the gap 7. Here, a spacer (not shown) for keeping the gap 7 uniform is provided to the liquid crystal 4.

In addition, in the liquid crystal display panel 1, the transparent electrodes 5 on the transparent substrates 2 intersect in a matrix pattern, and each picture element 3 is formed on its intersecting portions.

Furthermore, in the liquid crystal panel 1, a black matrix (light shielding means) 9 for shielding lights except for lights which enter the picture elements 3 is formed on each transparent substrate 2 so as to surround each picture element 3.

Therefore, the black matrix 9 is formed in a checkerboard pattern, namely, a net-like pattern. The black matrix 9 can reduce interference of lights among the picture elements 3, and can clarify and improve quality of displayed images by each picture element 3. Normally, a width of the black matrix 9 is set for approximately 200 μm.

In addition, three-color filters (B, G, R) 3a for displaying of images in color are provided in a portion which is surrounded with the black matrix 9.

The above embodiment describes one example of a simple matrix-type liquid crystal display elements shown in FIG. 3 which is used in the liquid crystal display panel 1, but the present invention is not limited to this, so an active matrix-type liquid crystal display element, such as a thin film transistor-type liquid crystal display element (TFT-LCD), is also effectively used.

Figure 4:
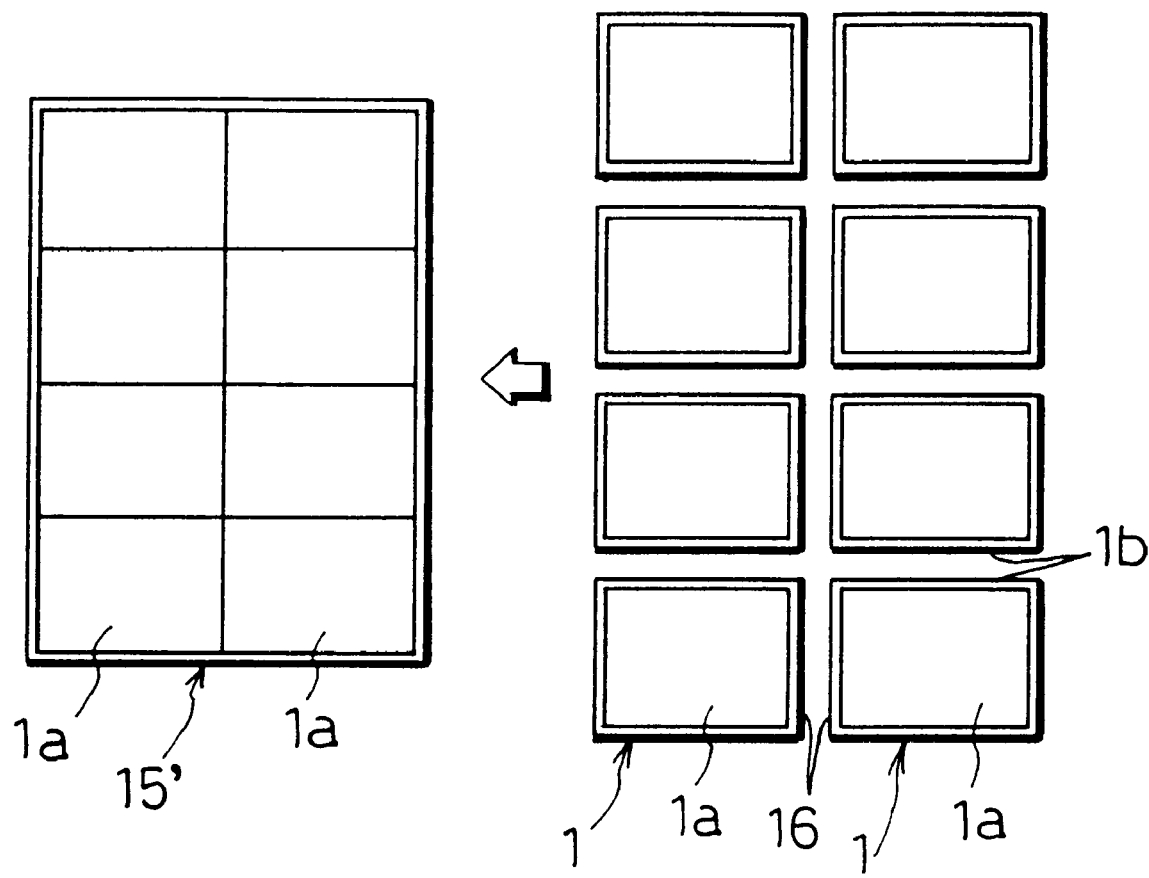
FIG. 4 is an explanatory drawing of a junction panel obtained by joining the eight liquid crystal display panels to one another.

As shown in FIG. 2, the junction panel 15 is formed by joining sides 1b of the two liquid crystal display panels 1 which face each other so that the two display surfaces 1a become flush. Here, as shown in FIG. 4, a junction panel 15' may be also formed by joining sides 1b of eight liquid crystal panels 1 which face each other so that the eight display surfaces 1a become flush.

As shown in FIG. 1, the sealing member 8 is provided along the outer edge of the liquid crystal display panel 1 so as to surround the black matrix 9 from outside. Moreover, a width of a sealing member 8a along the side 1b to be joined is narrower than a width of a sealing member 8b on the other three sides and is narrower than a width of the black matrix 9.

Furthermore, the sealing member 8a is exposed along the side 1b so as to be plane with each end face of the side 1b. Each distance between each picture element 3 adjacent to the sealing member 8a and the side 1b is set so as to be narrower than the width of the black matrix 9, namely, so as to be not more than ½ the width of the black matrix 9, for example.

When the sealing member 8a is formed in such a way and the sides 1b of each liquid crystal display panel 1 are joined each other so that the junction panel 15 is obtained, a difference between a total of the width of each sealing member 8a and the width of the black matrix 9 in the junction portion of each liquid crystal display panel 1 on the junction panel 15 can be lowered.

As a result, a change in a pitch of each picture element 3 including the junction section on junction panel 15 can be controlled, and images which are displayed on each liquid crystal display panel 1 can be seen as an integrated image on the junction panel 15. Therefore, occurrence of distortion of a displayed image due to the great change in the pitch of each picture element 3 can be prevented.

As a result, the arrangement of the embodiment 1 can improve quality of a displayed image on the junction panel 15 obtained by joining each liquid crystal display panel 1.

Incidentally, since each substrate is previously joined in the conventional method, a projecting section is formed on a junction portion of the substrates for forming a gap where liquid crystal is sealed. For this reason, in order to smooth a surface of the projecting section, an expensive laser process is required for the projecting portion.

However, with the above-mentioned arrangement, since the liquid crystal display panel 1 where the liquid crystal 4 has been sealed are joined, the expensive laser process can be omitted, thereby making it possible to avoid rising of costs of production.

Here, a number of the liquid crystal display panels 1 for arranging the junction panel 15 is not limited to the above-mentioned number, so the present invention is applicable to the case where a plurality of liquid crystal display panels 1 are joined.

Figure 5:
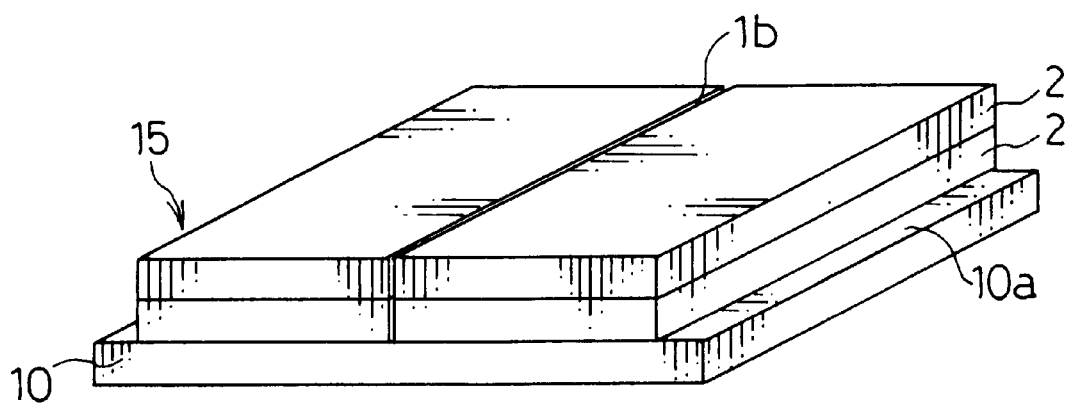
FIG. 5 is a perspective view which shows a state that the junction panel shown in FIG. 2 is stuck to a supporting substrate.

In addition, as shown in FIG. 5, the junction panel 15 obtained by joining the plural liquid crystal display panels 1 may be accurately stuck to a surface 10a of a supporting substrate 10. Therefore, the surface 10a has a larger area than the junction panel 15. With such an arrangement, strength of the junction panel 15 can be further improved, and distortion and displacement of the junction panel 15 due to aging can be decreased. As a result, the quality of displayed images on the junction panel 15 can be stably maintained for a long time.

In the case where the supporting substrate 10 is stuck to a display surface side of the junction panel 15 and the case where the junction panel 15 is composed of a transmitting-type liquid crystal panel, a glass substrate or a plastic substrate having light transmitting properties is used as the supporting substrate 10, whereas in the case where the supporting substrate 10 is provided to an opposite side to the display surface side of the junction panel 15 composed of a reflection-type liquid crystal panel, it is not necessary that the supporting substrate 10 particularly has light transmitting properties, so a devitrified plastic substrate, etc. can be used.

Figure 6:
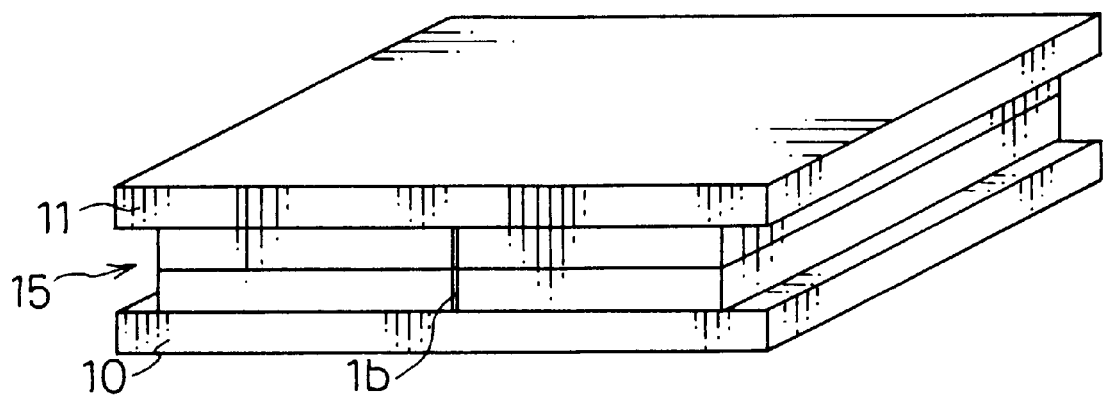
FIG. 6 is a perspective view which shows a state that the junction panel shown in FIG. 2 is stuck to a supporting substrate and an auxiliary substrate.

Furthermore, as shown in FIG. 6, an auxiliary substrate 11 which is similar to the supporting substrate 10 may be stuck to a face which is opposite to a surface of the junction panel 15 where the supporting substrate 10 is stuck. As a result, the strength of the junction panel 15 can be further improved.

Figure 7:
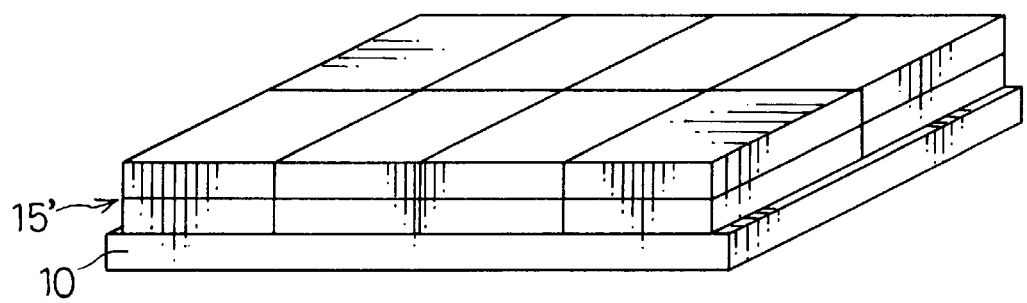
FIG. 7 is a perspective view which shows a state that the junction panel shown in FIG. 4 is stuck to a supporting substrate.
Figure 8:
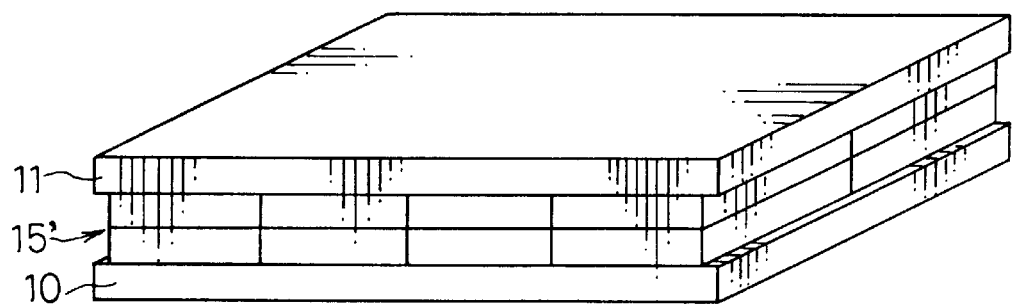
FIG. 8 is a perspective view which shows a state that the junction panel shown in FIG. 4 is stuck to a supporting substrate and an auxiliary substrate.

In addition, as shown in FIGS. 7 and 8, the supporting substrate 10 may be stuck to the above-mentioned junction panel, 15' obtained by the eight liquid crystal display panels 1 are joined, and moreover, the supporting substrate 10 and the auxiliary substrate 11 may be stuck thereto.

Further, a liquid crystal display apparatus with a large screen is arranged such that each liquid crystal display panel 1 is placed and fixed on the supporting substrate 10 with a large area. From a viewpoint of reliability, such as workability of positioning of each liquid crystal display panel 1, resistance to stress, it is desirable that the liquid crystal display panels 1 are formed on the supporting substrate 10. Moreover, in order to prevent displacement of the position where each liquid crystal display panel 1 is fixed, the auxiliary substrate 11 may be also provided to the other side of the junction panel 15.

Furthermore, a pattern of the sealing member 8 is not limited to that shown in FIG. 1, the sealing member 8 may have any pattern as long as the liquid crystal 4 can be sealed and uniformity of the gap for the liquid crystal of the liquid crystal panels 1 can be improved.

Figure 9:
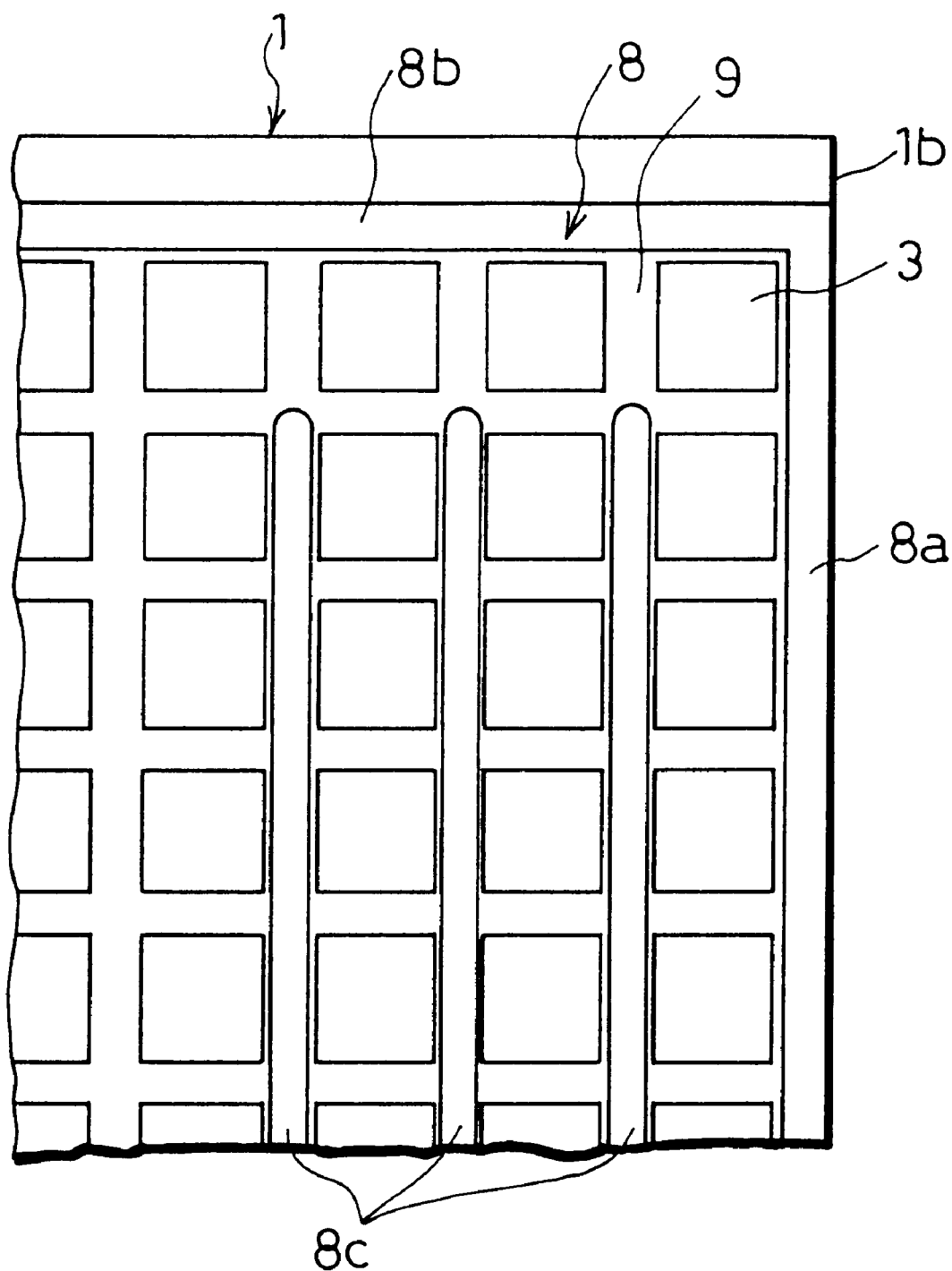
FIG. 9 is a constitutional drawing of a main section which shows one example of a pattern of sealing members of the liquid crystal display panel.
Figure 10:
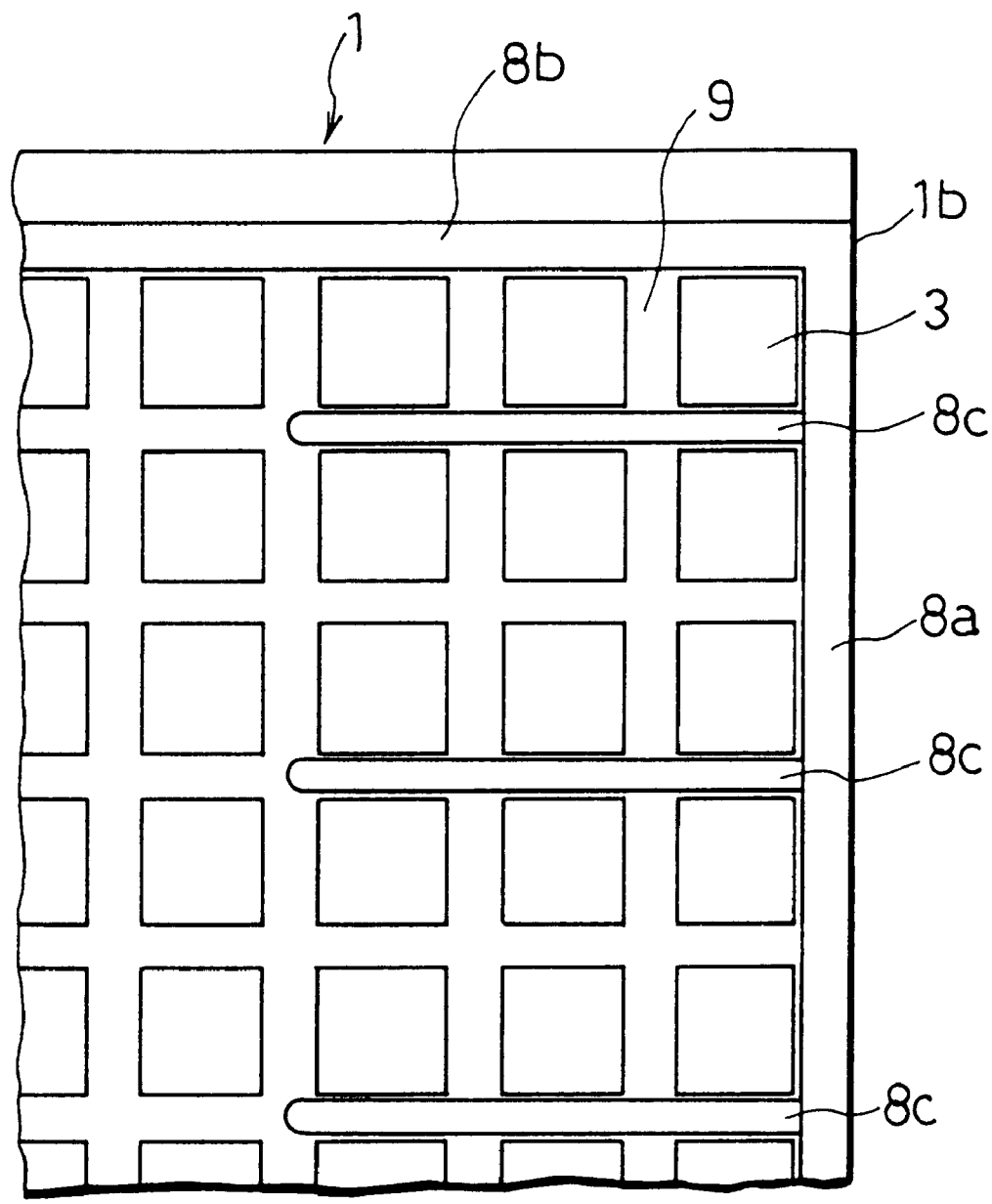
FIG. 10 is a constitutional drawing of a main section which shows another example of a pattern of the sealing members.
Figure 11:
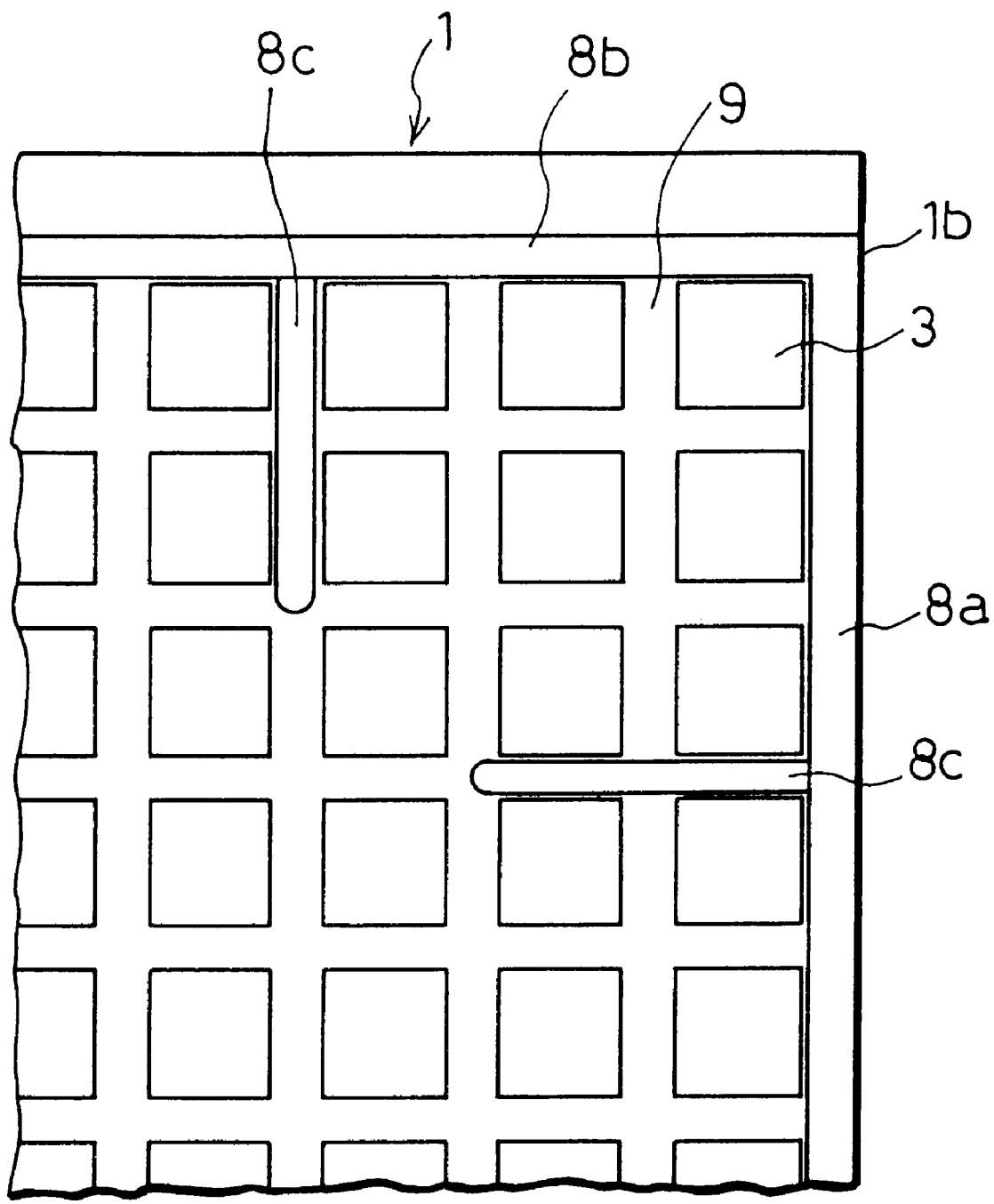
FIG. 11 is a constitutional drawing of a main section which shows still another example of a pattern of the sealing members.

In order to especially improve the sealing strength on the liquid crystal display panels 1, it is desirable that the sealing member 8 is formed along a position where the black matrix 9 has been formed. As shown in FIGS. 9 through 11, for example, a zonal sealing member 8c for reinforcement may be formed along each formed portion of the black matrix 9 which is adjacent to the sealing member 8a on the junction side of the liquid crystal display panel 1. As a result, even when the width of the sealing member 8a is set small, accuracy and strength of intervals of each substrate 2 on the junction side of the liquid crystal display panel 1 can be improved, thereby making it possible to stabilize the quality displayed images on the liquid crystal display panel 1.

Figure 12:
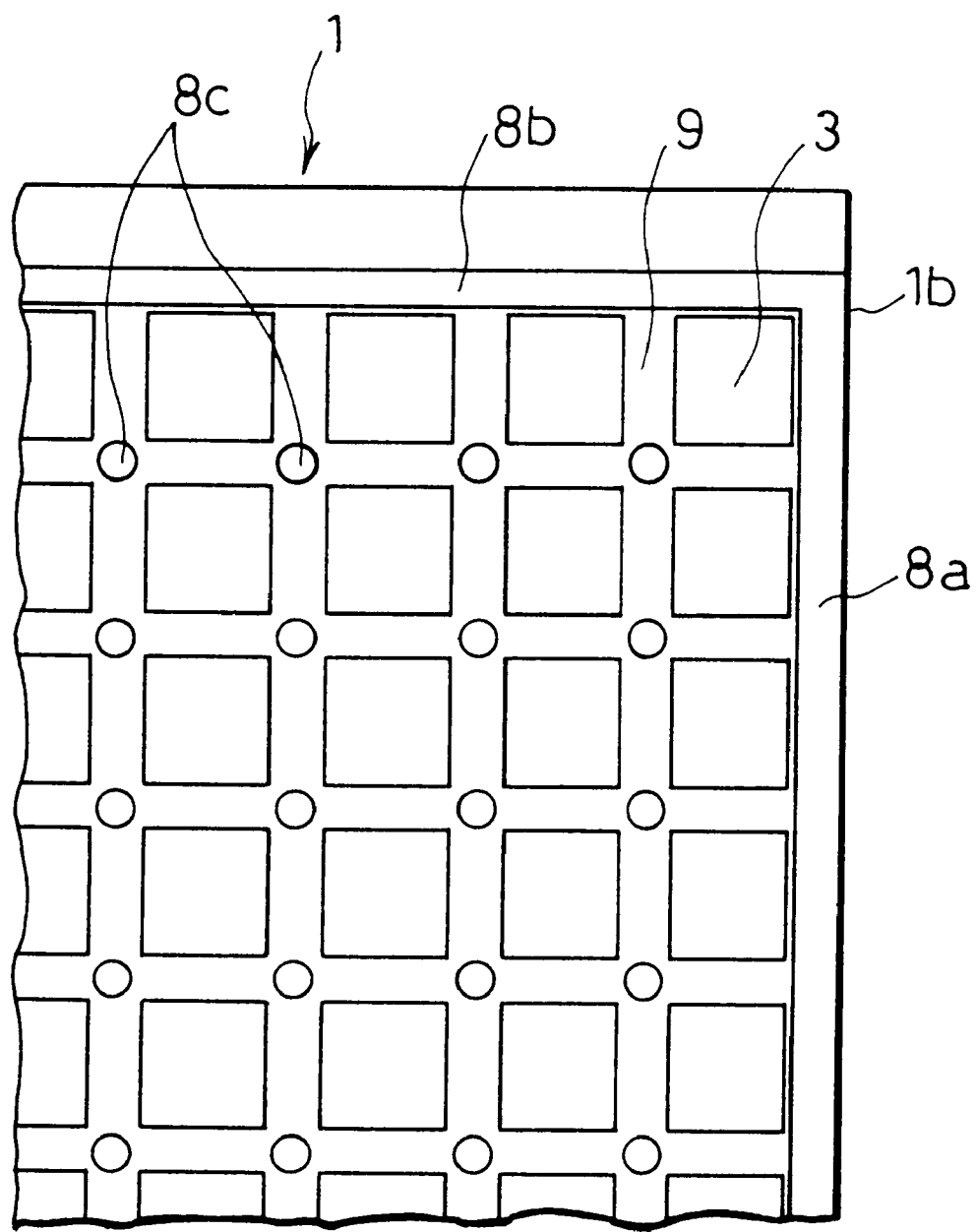
FIG. 12 is a constitutional drawing of a main section which shows still another example of a pattern of the sealing members.

In addition, as shown in FIG. 12, for example, cylindrical sealing members 8c for reinforcement may be formed in positions which are intersections of the black matrices 9. As a result, whole sealing strength of the liquid crystal display panel 1 can be improved.

Incidentally, as mentioned above, the width of the sealing member 8a which is the sealing width of the junction section side should be set narrower than the width of the black matrix 9. In a method for printing a conventional sealing member, although drawing with a line width of approximately 100 $\mu$m is possible, it is difficult to control a thickness of a sealing member, so the thickness is approximately dozens $\mu$m under present conditions. Since the formed sealing member is approximately crushed to a thickness of a liquid crystal layer, the width of the obtained sealing member is widened approximately several times the width of the drawing line.

Therefore, when the printing method is used, high positioning accuracy cannot be desired, and it is almost impossible to print the sealing member 8 according to the fine black matrix 9 of approximately 200 $\mu$m and below.

For this reason, in the present invention, the pattern of the sealing member 8 is drawn and formed by using a dispenser unit. The dispenser unit is provided with a syringe containing materials for drawing in x and y or x, y and z coordinates, for example. The dispenser unit actuates the syringe or the substrate so as to draw and form a pattern of a sealing member.

A pattern of a sealing member having a line width of dozens $\mu$m can be drawn with high positioning accuracy (several $\mu$m to dozens $\mu$m, for example) by using this dispenser unit. Moreover, when a gap between a nozzle of the syringe of the dispenser and the substrate is successively measured by an optical sensor, etc. and a position of the syringe is controlled so that the gap has a prescribed interval, it is also possible to stably form the pattern of a sealing member with a thickness of approximately several $\mu$m by drawing.

Therefore, in order to produce the liquid crystal display apparatus of the present invention, it is desirable that the pattern of a sealing member is drawn by using the above-mentioned dispenser unit or a similar apparatus.

The thickness of the pattern of a sealing member is set according to a thickness of a liquid crystal layer (approximately 5 $\mu$m, for example), so it is set within twice the thickness of the liquid crystal layer, and more preferably to a value obtained by adding 1 $\mu$m to 3 $\mu$m to the thickness of the liquid crystal layer. As a result, after substrates for catching liquid crystal therebetween are laminated by the sealing member and the sealing member is hardened, the pattern of a sealing member (finished pattern) can be formed accurately with high accuracy.

Incidentally, since a thermosetting-type adhesive resin has been conventionally used as a sealing member, when the adhesive resin is hardened by a heat, alignment of the liquid crystal in a vicinity of the sealing member becomes irregular for a width of several hundred $\mu$m due to the heat. Moreover, in the case where adhesive resin containing a solvent is used, the solvent is dissolved into the liquid crystal, so the alignment of the liquid crystal in the vicinity of the sealing member becomes irregular for a width of several hundred $\mu$m due to the solvent.

However, in the case where ultraviolet rays hardening-type adhesive resin or solventless adhesive resin is used as the sealing member, the alignment of the liquid crystal in the vicinity of the sealing member hardly changes, and the alignment becomes irregular for a width of at most dozens $\mu$m. As a result, in the liquid crystal display apparatus of the present invention, the ultraviolet hardening-type adhesive resin or the solventless adhesive resin is used as the sealing member 8.

In order to form a layer of the liquid crystal 4 with an uniform thickness, a so-called spacer, such as glass fiber or glass beads with a diameter according to the layer thickness of the liquid crystal 4, are added to the sealing member 8 for forming a liquid crystal display element.

In the case of the present invention, in order to form the pattern of a sealing member with a narrow width, a tip diameter of the syringe of the dispenser unit must be fine. Therefore, it is desirable that the spacer to be added to the sealing member 8 (spacer in the seal) has a spherical shape.

As to the spacer in the seal, its material is not particularly limited, so glass, silica, plastic, etc. can be used. It is confirmed that the pattern of the finished seal of the liquid crystal display element produced in such a manner has a width of within dimensional accuracy of ±10%.

A description about a pattern of a sealing member on portions except for the junction section is omitted, but since the seal on the portions except for the junction section does not affect displaying, the width of the pattern may be wide as long as the pattern does not exceed the section of the picture element 3. In other words, it is possible enough to previously form a sealing member 8b on a portion where a comparatively rough pattern is acceptable by means of the printing method and to draw only the sealing member 8a on the junction section so as to form the sealing member 8a by using the dispenser unit.

Incidentally, as mentioned above, each liquid crystal panel 1 is produced after the liquid crystal 4 is sealed thereinto and the junction section is cut, so it is desirable that the pattern of the sealing member before cutting can restrain stress due to the cutting in every way.

A method for cutting a substrate by scribing it through a diamond cutter, etc. (scribing method), a method for cutting a substrate by using a dicing unit (dicing method), etc. can be used for the cutting.

As mentioned above, the scribing method damages one surface of the substrate so as to cut the substrate by applying stress thereto. Accuracy of the cut surface greatly depends upon a material of the substrate, so it is difficult to cut the substrate with high accuracy when the substrate is composed of an amorphous material, such as glass. In other words, the scribing method cannot control perpendicularity of a cut end surface, so accuracy of the junction section after lamination cannot be obtained.

Therefore, the dicing method, a method for cutting a substrate by using a wire saw or a similar method is preferable to the method for cutting a substrate with high dimensional accuracy and with high positioning accuracy while controlling the perpendicularity of the cut end surface.

As shown in FIG. 13, in the case where each substrate 2 is cut by using the dicing method, for example, its finishing varies with a rotating speed of a dicing blade 12, a feeding speed of the dicing blade 12 and a size of an abrasive grain 12a which is used for the dicing blade 12, but the perpendicularity of the cut end surface can easily falls within a range of 85° to 95°.

The cut end surface of each substrate 2 greatly depends upon the size of the abrasive grain 12a, and the cut end surface can be finished fairly smoothly. When the abrasive grain 12a of #600 is used, for example, the cut end surface is finished so as to have roughness of not more than 50$\mu$m.

In addition, in embodiment 1, in order to decrease the width of the junction section of the junction panel 15 for inconspicuousness of the junction section, it is preferable that the roughness is set to not more than ¼ the width of the black matrix 9. Therefore, it is desirable that the abrasive grain 12a of approximately ™600 or more is used. As a result, deterioration of the quality of displaying on the junction panel 15 can be avoided, so the excellent quality of displayed images can be maintained.

Figure 14:
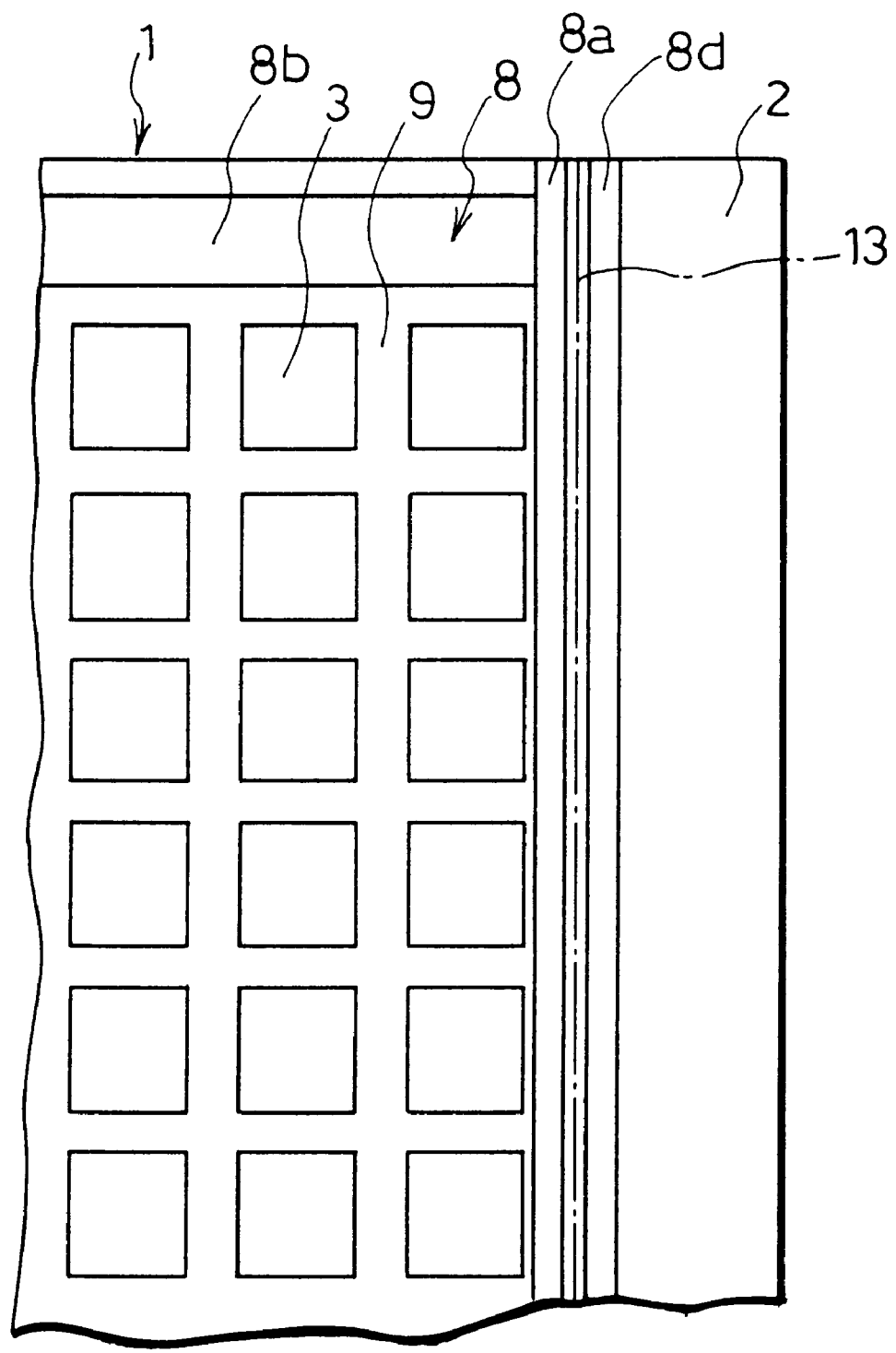
FIG. 14 is a constitutional drawing of a main section which shows one example of a pattern of sealing members for cutting each substrate of the liquid crystal display panel.
Figure 15:
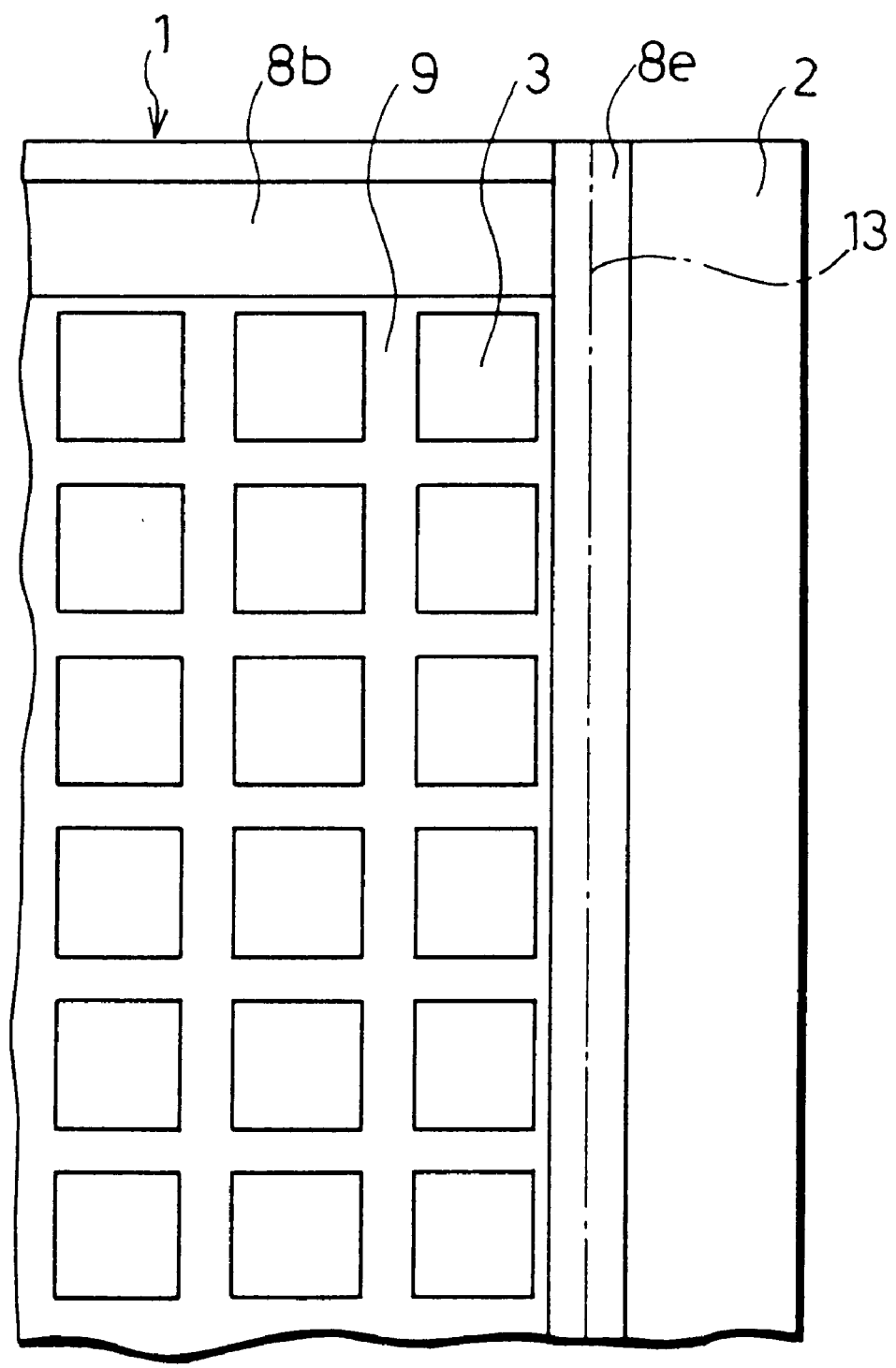
FIG. 15 is a constitutional drawing of a main section which shows another example of a pattern of the sealing members.

As shown in FIG. 14, for example, as to a basic pattern of the sealing member in the vicinity of the junction section on each substrate 2 before cutting, the pattern of the sealing member is formed so as to have a zonal auxiliary sealing member 8d which is symmetric with respect to a cut line (represented by alternate long and short dash lines in the drawing) 13, namely, is parallel to the sealing member 8a on the junction side at prescribed intervals.

In addition, as shown in FIG. 13, the above-mentioned prescribed intervals are set such that when each substrate 2 is cut in a thickness-wise direction by the dicing blade 12, each sealing member 8a·8d contacts with the both sides of the dicing blade 12 partially and equally.

As shown in FIG. 13, the substrates 2 which have been laminated by the sealing members 8a·8b·8d are cut along the cut line 13 in its thickness-wise direction by the dicing blade 12.

Since the liquid crystal 4 has been previously sealed between the substrates 2 by the sealing member 8, chips at the time of cutting are prevented from entering the gap 7 where the liquid crystal 4 has been sealed, and wash water for the dicing blade 12 at the time of cutting is also prevented from entering the gap 7. As a result, it is not necessary to worry about a harmful influence upon the quality of displayed images on the liquid crystal display panel 1 due to the cutting.

Furthermore, at the time of cutting, the sealing members 8a·8d are arranged on the both sides of the dicing blade 12 substantially equally, and the substrates 2 is elastically supported by the sealing members 8a·8d, so stress which is applied to each substrate 2 due to the cutting is diffused and absorbed by the sealing members 8a·8d.

The stress to be applied to the cut portion of each substrate 2 due to the cutting of each substrate 2 can be diffused and reduced by forming the sealing member 8d between the substrates 2. For this reason, roughness of the cut end surface can be low, namely, the cut end surface can be smooth, and a crack and damage to the substrates 2 can be avoided. Moreover, residual stress can be reduced, and distortion and irregularity of the substrates 2 due to aging can be prevented.

Therefore, in the junction panel 15 obtained by joining the liquid crystal display panels 1 using the substrates 2 having little damage and distortion, roughness on a joint portion between the liquid crystal panels 1 can be reduced, so the quality of displayed images on the junction panel 15 can be further improved. Moreover, since irregularity, etc. due to aging is prevented, the excellent quality of displayed images can be maintained stably for a long time.

Here, FIGS. 15 through 18 show another examples of the patterns of the sealing member. In another example of the pattern of the sealing member shown in FIG. 15, after a zonal sealing member 8e with a width twice that of the sealing member 8a is formed in the same manner as of the sealing member 8a and substrates 2 are laminated, the substrates 2 including the sealing member 8e are cut by the dicing blade 12 along a cut line 13 which is a center line in a longitudinal direction of the sealing member 8e.

A width of the sealing member 8e and operating conditions of the dicing blade 12 are set so that a width of the residual sealing member on the picture element 3 side of the cut sealing member 8e corresponds to the width of the sealing member 8a.

Figure 16:
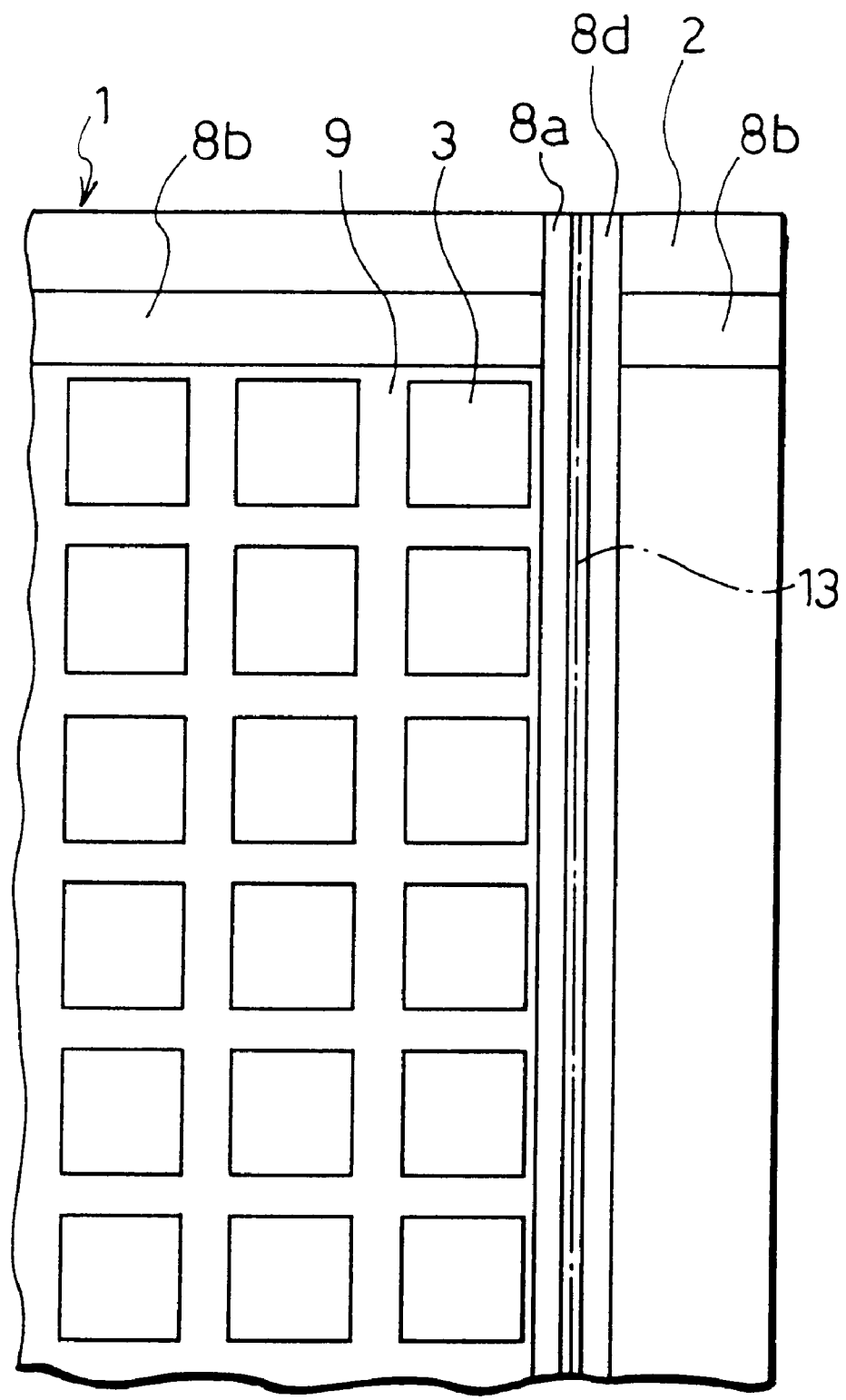
FIG. 16 is a constitutional drawing of a main body which shows still another example of a pattern of the sealing members.

In addition, in still another example of the pattern of the sealing member shown in FIG. 16, a sealing member 8b is further stretched up to the substrate 2 side which is removed by cutting. As a result, abnormal vibration of the substrates 2 at the time of cutting by the dicing blade 12, etc. can be suppressed, thereby making it possible to cut the substrates 2 more stably.

Figure 17:
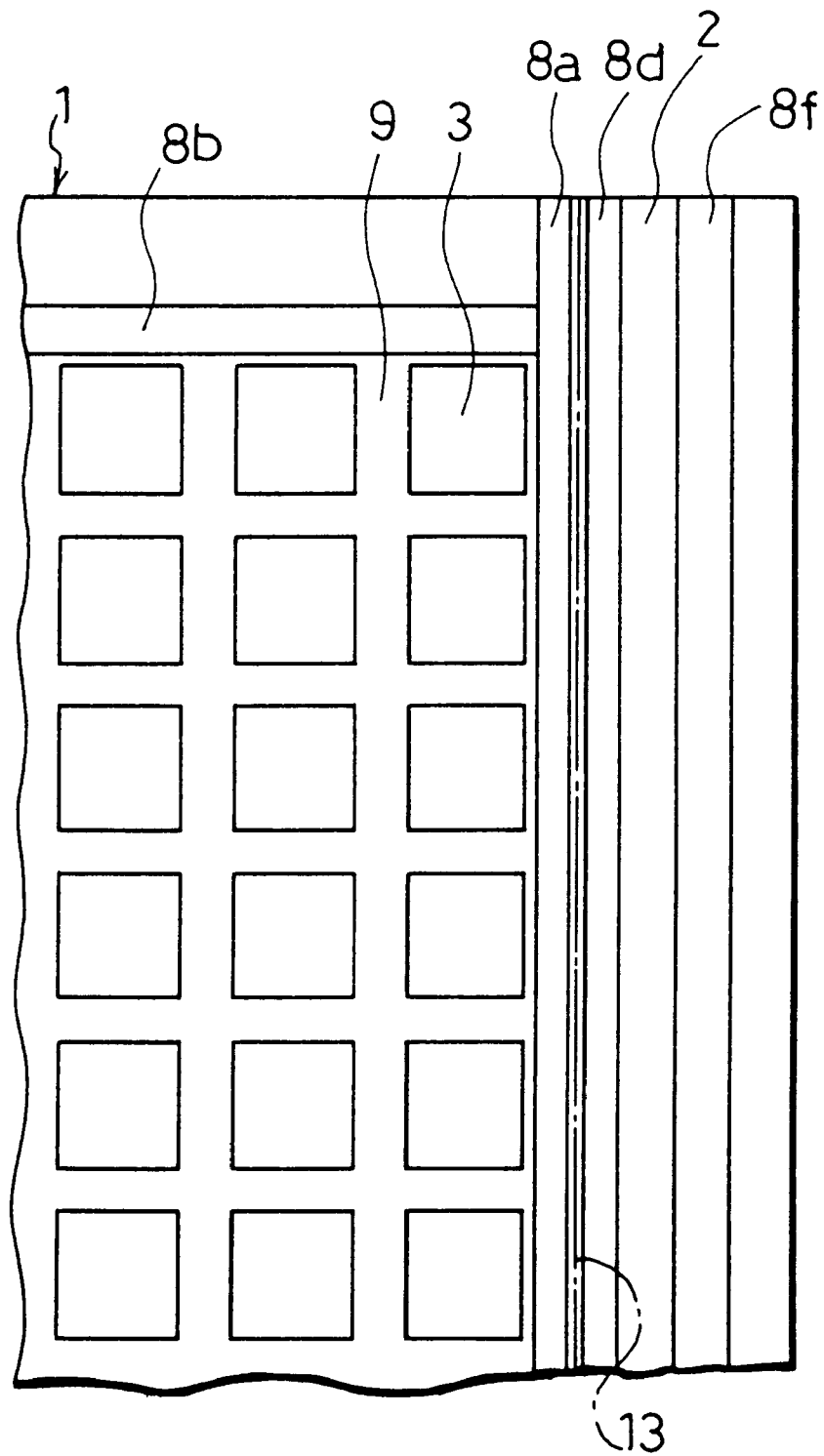
FIG. 17 is a constitutional drawing of a main body which shows still another example of a pattern of the sealing members.

In still another example of the pattern of the sealing member shown in FIG. 17, in addition to the pattern of the sealing member shown in FIG. 14, a zonal auxiliary sealing member 8f, which is parallel to the outside of a sealing member 8d at a prescribed interval, is formed. In such a pattern of the sealing member, since an area of the substrates 2 supported by the sealing member 8 can be increased, the abnormal vibration of the substrates 2 due to the cutting by the dicing blade 12 can be further suppressed, thereby making it possible to cut the substrates 2 more stably.

Figure 18:
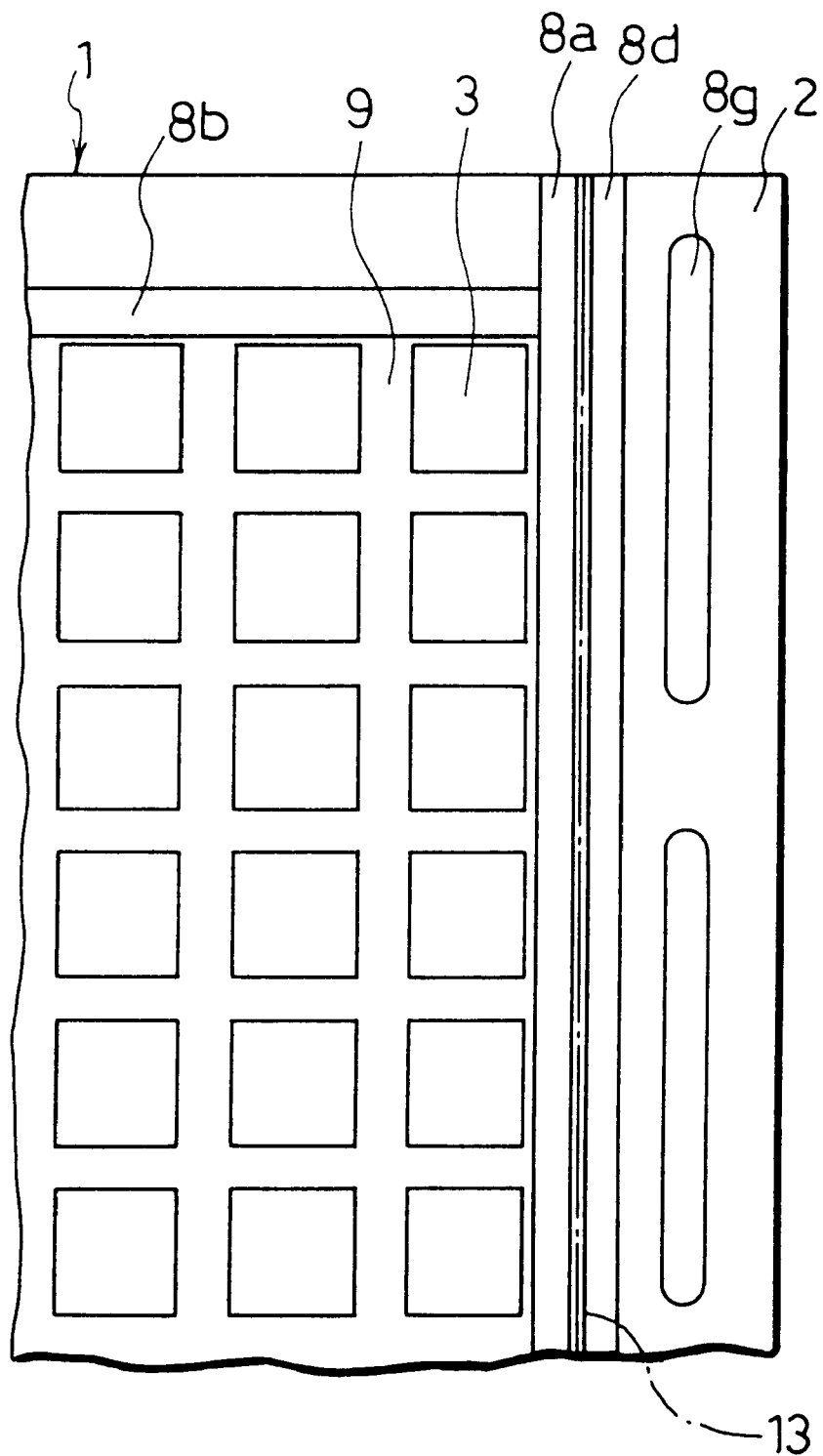
FIG. 18 is a constitutional drawing of a main body which shows still another example of a pattern of the sealing members.

In still another example of the pattern of the sealing member shown in FIG. 18, in addition to the pattern of the sealing member shown in FIG. 14, a rectangular auxiliary sealing members 8g, which are parallel to the outside of the sealing member 8d at a prescribed interval, are formed. In such a pattern of the sealing member, since the area of the substrates 2 supported by the sealing member 8 can be increased and a peak of characteristic frequency on the substrates 2 can be reduced, the abnormal vibration of the substrates 2 due to cutting by the dicing blade 12 can be further suppressed, thereby making it possible to cut the substrates 2 more stably.

Here, the patterns of sealing members inside the black matrix 9 in FIGS. 14 through 18 correspond to those shown in FIGS. 9 through 12.

As mentioned above, when the arrangement and the method of embodiment 1 are used, since a liquid crystal display apparatus is composed of a plurality of liquid crystal panels 1 having a size which ensures easy production, for example, a size of 10 inches, the liquid crystal display apparatus having a large screen and having excellent quality of displayed images can be easily and efficiently produced with excellent yield without deteriorating continuity of the displayed images.

[EMBODIMENT 2]

Figure 19:
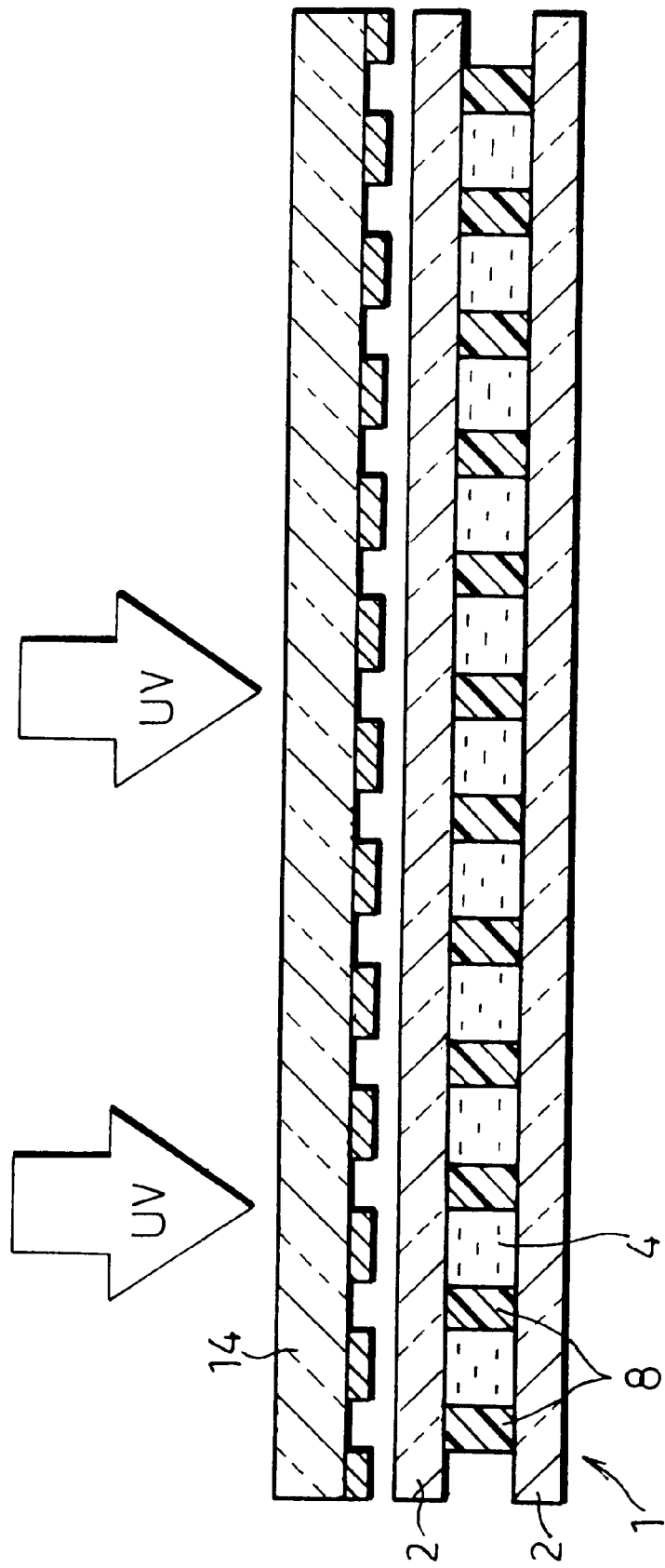
FIG. 19 is a cross section of a main section which shows one process for producing a liquid crystal display panel of embodiment 2 in the liquid crystal display apparatus of the present invention and its producing method.
Figure 20:
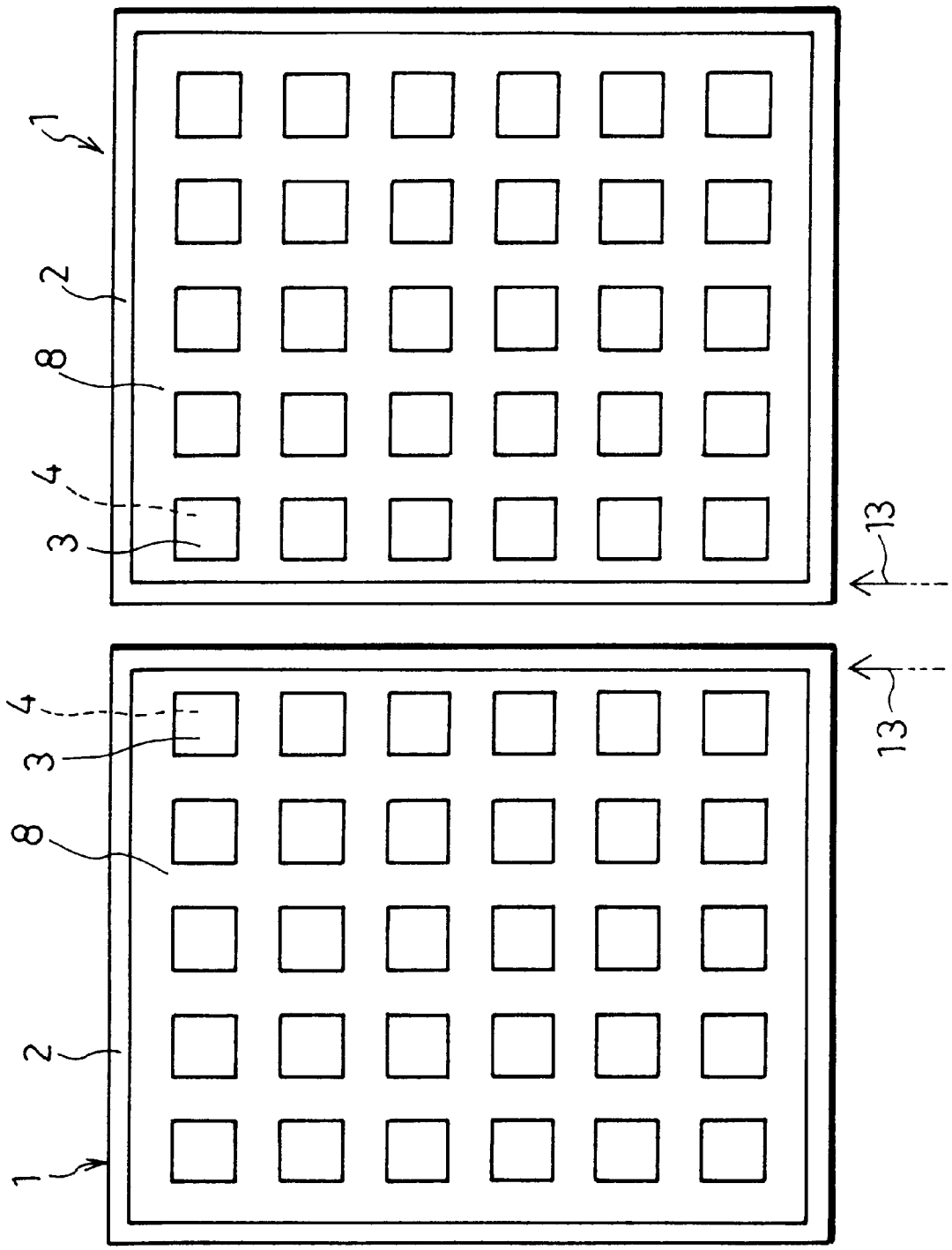
FIG. 20 is a schematic plane view of the liquid crystal display panels to be joined.

The following will discuss another embodiment of the present invention as embodiment 2 referring to FIGS. 19 through 20. Here, for convenience of explanation, those members that have the same arrangement and functions, and that are described in the aforementioned embodiment 1 are indicated by the same reference numerals and the description thereof is omitted.

A liquid crystal display apparatus of the embodiment 2 is formed in the similar manner to in embodiment 1 except that sealing members are different from of embodiment 1. In other words, as a sealing member, photopolymeric monomers are used. The photopolymeric monomers are an ultraviolet hardening-type polymeric resin material which is hardened by irradiation of ultraviolet rays.

Next, the following will discuss a method for forming the above sealing member. First, a mixture is previously prepared by mixing the photopolymeric monomers, which are an ultraviolet rays hardening-type polymeric resin material hardened by irradiation of ultraviolet rays, with a liquid crystal material, and the mixture is sealed in a gap between substrates 2 which composes a liquid crystal display panel 1.

Thereafter, as shown in FIG. 19, ultraviolet rays (represented by UV in the drawing) are irradiated to the mixture by using a photolithography method so that a prescribed pattern 14 of the sealing member is obtained. Only the monomers on a portion, to which the ultraviolet rays have been irradiated so that the pattern 14 of the sealing member is obtained, is polymerized, and the above monomers become a polymer having sealing properties. As a result, a sealing member 8 according to the pattern 14 is formed between the substrates 2.

At this time, when only a necessary amount of monomers for the sealing member 8 are previously mixed with the liquid crystal material and the polymer is created by polymerizing the monomers on the UV irradiated portion having the pattern 14, concentration of the monomers on the UV irradiated portion is lowered. Therefore, the monomers which distribute around the above-mentioned polymer are successively moved to the UV irradiated portion by dispersion, and the monomers are polymerized with one another or with polymer by the ultraviolet rays.

As a result, the liquid crystal 4 can be packed into the sealing member 8 without a process for packing the liquid crystal material. Moreover, since trouble of drawing and forming the sealing member 8 along the pattern of the sealing member can be saved, a process for obtaining the liquid crystal panel 1 can be simplified, thereby lowering its costs.

The above mixture was obtained by mixing 0.12 g of monomers (made by Nippon Kayaku Co., Ltd., R684) which is an acrylic resin material, 0.05 g of p-phenyl styrene, 0.75 g of isobornyl methacrylate, 4 g of a liquid crystal material (made by Merck & Co., Inc., ZLI-4792) and 0.0025 g of photopolymerization initiator (made by Ciba Geigy Ltd., Irugacur 651), for example. The monomers are a mixture of a monomer (Nippon Kasei Co., Ltd., R684) which is an acrylic resin material, p-phenyl styrene, isobornyl methacrylate.

When such photopolymeric resin materials which have been mixed with the liquid crystal material are used, the sealing member 8 can be easily formed by using the photolithography method, and also the sealing member 8 can be formed with high precision and with high accuracy.

In addition, as shown in FIG. 20, since the sealing member 8 can be formed with high accuracy, an aperture ratio of the picture elements 3 on the obtained liquid crystal display panel 1 can be improved. Each substrate 2 is cut along a cut line 13 in the same manner as of embodiment 1 and the liquid crystal display panels 1 are joined at its cut end surfaces so that the liquid crystal display apparatus having a large screen and having excellent quality of displayed images whose joint is inconspicuous can be stably obtained.

Furthermore, similarly to embodiment 1, the method of embodiment 2 makes it possible to form the sealing members 8a through 8g simultaneously with the sealing member 8 for sealing of the liquid crystal 4. As a result, the process for producing the liquid crystal display apparatus can be simplified, thereby making it possible to control costs of its production.

Here, in embodiment 2, all the sealing members 8 was formed by using photopolymeric resin materials, but portions except for the junction surfaces of the liquid crystal display panels 1 may be formed by using normal sealing members described in embodiment 1. Moreover, as to the method for cutting each substrate 2, the method described in embodiment 1 is used.

[EMBODIMENT 3]

Figure 21:
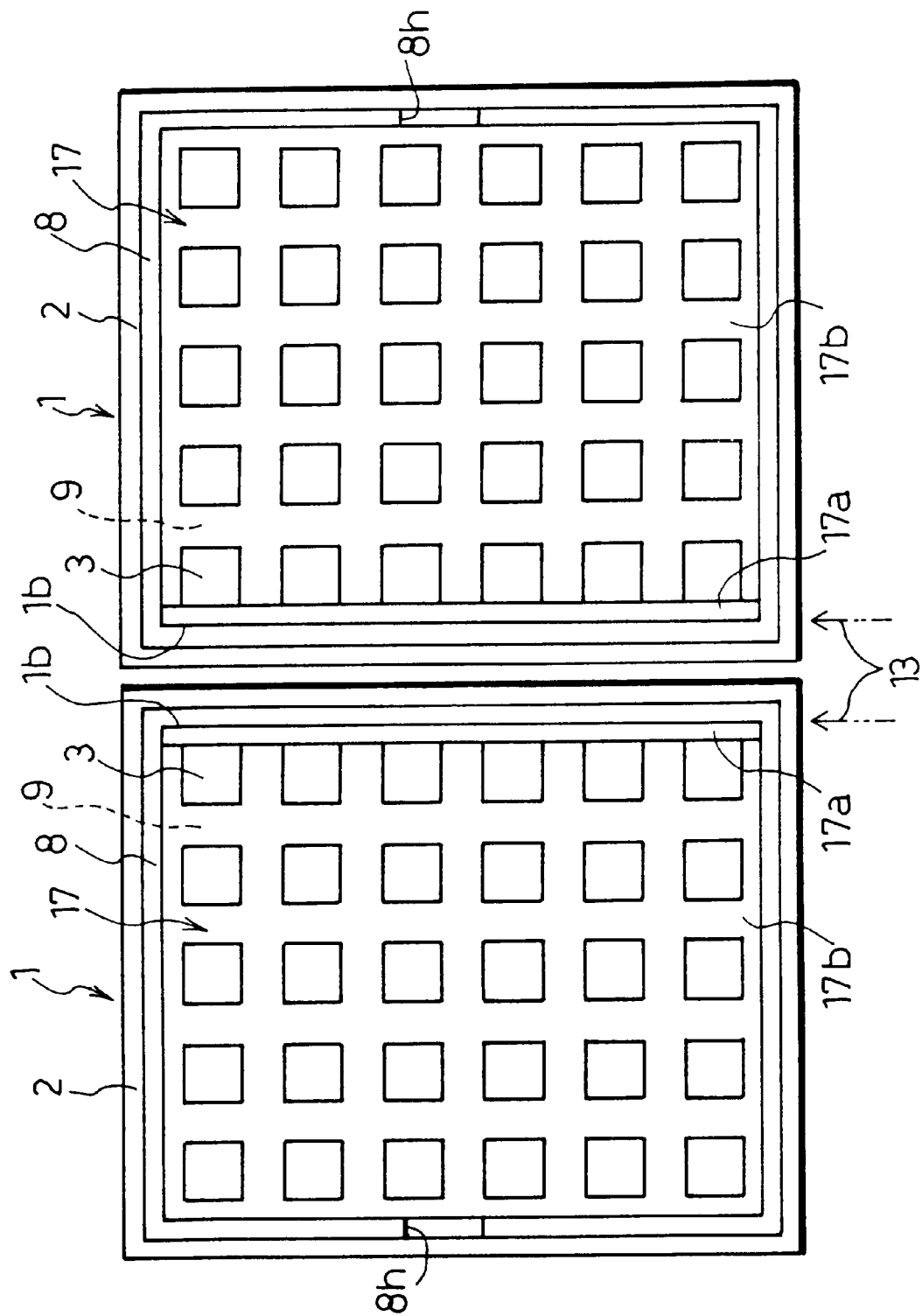
FIG. 21 is a schematic plane view of liquid crystal display panels joined in embodiment 3 in the liquid crystal display apparatus of the present invention.
Figure 22:
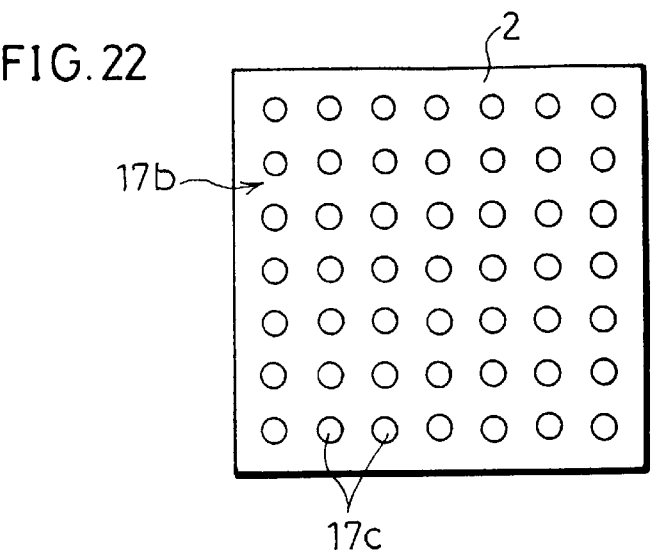
FIG. 22 is a schematic plane view which shows a pattern of a sealing member to be formed around picture elements in the liquid crystal display panel.
Figure 23:
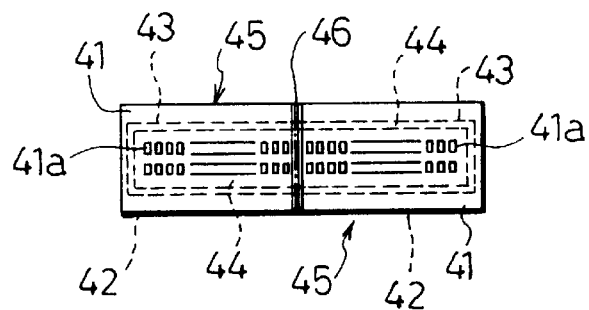
FIG. 23 is a plane view of a conventional liquid crystal display apparatus.
Figure 24:
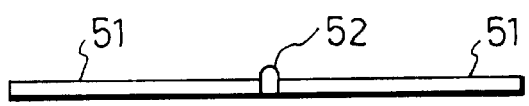
FIGS. 24(a) through 24(c) are a process drawing which shows a method for producing another conventional liquid crystal display apparatus.
Figure 24:
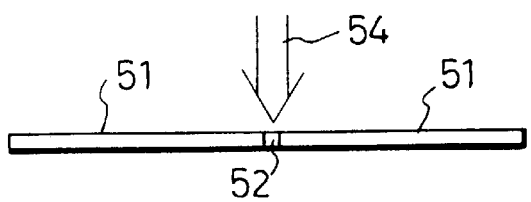
Figure 24:
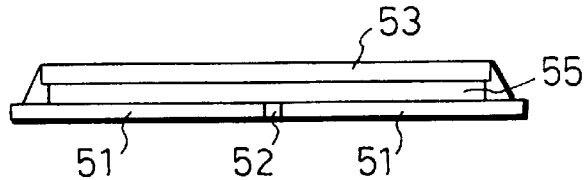

The following will discuss still another embodiment of the present invention referring to FIGS. 21 and 22. Here, for convenience of explanation, those members that have the same arrangement and functions, and that are described in the aforementioned embodiment 1 are indicated by the same reference numerals and the description thereof is omitted.

In a liquid crystal display apparatus of embodiment 3, a sealing member 8 is formed between each substrates 2 along their outer edge sections, and a sealing member 17 is formed between each substrates 2 inside the sealing member 8 is formed along a position where a black matrix 9 has been formed. Here, an injection hole 8h is provided to the sealing member 8 so that the liquid crystal is injected between the substrates 2.

Adhesive photoresist, such as cyclized rubber-family photoresist is used as the sealing member 17. As to the sealing member 17, a sealing member 17a on a zonal junction side which faces a junction surface 1b of the liquid crystal display panel 1 is composed of the photoresist.

Meanwhile, on a sealing member 17b which is a portion other than the sealing member 17a, spaces corresponding to picture elements 3 are connected so that liquid crystal 4 can be injected in each space, and in order to support each substrate 2, resist sections 17c are formed in a net-like configuration or, as shown in FIG. 22, like islands which are spaced uniformly.

When such photoresist is used as the sealing member 17, the sealing members 17 can be formed by a light in the same manner as of aforementioned embodiment 2. Therefore, the sealing member 17 can be formed with high precision and with high accuracy, thereby making it possible to improve an aperture ratio on each picture element 3 in the same manner as of the embodiment 2.

Furthermore, since the sealing member 17 is formed also inside the liquid crystal display panel 1, adhesive strength between the substrates 2 can be improved, and the picture elements 3 with a minute size can be respectively produced comparatively easily and stably. For this reason, in embodiment 3, the liquid crystal display panel 1 is not limited by a display mode, so selectivity of the display mode can be widen.

In embodiment 3, the TN (Twisted Nematic) normally white-type mode is used as a display mode, but any display mode can be used as long as liquid crystal for forming the picture elements 3 is sealed in a gap between into the substrates 2.

Examples of another display modes are a guest/host mode, an electrically controlled birefringence (ECB) mode, a super twisted nematic (STN) mode and a phase converting mode. Moreover, a surface stabilized ferroelectric liquid crystal (SSFLC) mode which uses chiral smectic liquid crystal, a polymer dispersed liquid crystal (PDLC) mode which uses a thinfilm membrane of polymer and liquid crystal, etc. can be used.

In addition, in the method of embodiment 3, for example, the photoresist, which is used as a masking material when an electrode of each picture element 3 is formed on the substrates 2, can be diverted to the sealing member 17, thereby making it possible to simplify the method for producing the liquid crystal display panel 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing a liquid crystal display apparatus comprising the steps of:

producing liquid crystal display elements each having a plurality of picture elements, which are arranged in a matrix pattern so as to display images by transmitting/shielding a transmitting light according to an image signal, a net-like light shielding means surrounding each picture element so as to shield a light entering a position where picture elements do not exist and a zonal sealing member, which is provided between substrates in order to seal liquid crystal in the liquid crystal display elements; and forming said liquid crystal display apparatus by joining at least two said liquid crystal display elements so that a junction edge of one liquid crystal display element is adjacent a junction edge of an adjacent liquid crystal display element and display surfaces of said liquid crystal display elements are flush, wherein said zonal sealing member of each pair of adjacent liquid crystal display elements includes a sealing member portion on a side of the junction edge formed along a junction surface of said liquid crystal display elements, said sealing member portion having a width that is narrower than a width of said light shielding means between adjacent picture elements, and wherein said liquid crystal display elements are obtained by cutting said substrates which have been laminated by the sealing member on the junction side in its thickness-wise direction along the outside of the sealing member on the junction side.

2. The method for producing a liquid crystal display apparatus as defined in claim 1 wherein said substrates are cut by a dicing blade in its thickness-wise direction along the outside of the sealing member on the junction side, said dicing blade being set so that roughness of a cut surface of each substrate becomes narrower than one-fourth the width of said light shielding means.

3. A method for producing a liquid crystal display apparatus comprising the steps of:

producing liquid crystal display elements each having a plurality of picture elements, which are arranged in a matrix pattern so as to display images by transmitting/shielding a transmitting light according to an image signal, a net-like light shielding means surrounding each picture element so as to shield a light entering a position where picture elements do not exist and a zonal sealing member, which is provided between substrates in order to seal liquid crystal in the liquid crystal display elements; and forming said liquid crystal display apparatus by joining at least two said liquid crystal display elements so that a junction edge of one liquid crystal display element is adjacent a junction edge of an adjacent liquid crystal display element and display surfaces of said liquid crystal display elements are flush, wherein said zonal sealing member of each pair of adjacent liquid crystal display elements includes a sealing member portion on a side of the junction edge formed along a junction surface of said liquid crystal display elements, said sealing member portion having a width that is narrower than a width of said light shielding means between adjacent picture elements, and wherein said liquid crystal display elements are obtained by forming a supporting sealing member, which supports each substrate at a prescribed distance from the zonal sealing member on the junction side, between the substrates and thereafter by cutting said substrates between the zonal sealing member on the junction side and the supporting sealing member in its thickness-wise direction by a dicing blade.

4. A method for producing a liquid crystal display apparatus comprising the steps of:

producing liquid crystal display elements each having a plurality of picture elements, which are arranged in a matrix pattern so as to display images by transmitting/shielding a transmitting light according to an image signal, a net-like light shielding means surrounding each picture element so as to shield a light entering a position where picture elements do not exist and a zonal sealing member, which is provided between substrates in order to seal liquid crystal in the liquid crystal display elements; and forming said liquid crystal display apparatus by joining at least two said liquid crystal display elements so that a junction edge of one liquid crystal display element is adjacent a junction edge of an adjacent liquid crystal display element and display surfaces of said liquid crystal display elements are flush, wherein said zonal sealing member of each pair of adjacent liquid crystal display elements includes a sealing member portion on a side of the junction edge formed along a junction surface of said liquid crystal display elements, said sealing member portion having a width that is narrower than a width of said light shielding means between adjacent picture elements, and wherein said zonal sealing member is composed of a polymer having sealing properties which is obtained by packing a mixture containing liquid crystal and photo-polymeric monomers between said substrates, by irradiating a light to the mixture between the substrates in a prescribed pattern and by polymerizing the monomer according to the pattern.

5. A method for producing a liquid crystal display apparatus comprising the steps of:

producing liquid crystal display elements each having a plurality of picture elements, which are arranged in a matrix pattern so as to display images by transmitting/shielding a transmitting light according to an image signal, a net-like light shielding means surrounding each picture element so as to shield a light entering a position where picture elements do not exist and a zonal sealing member, which is provided between substrates in order to seal liquid crystal in the liquid crystal display elements; and forming said liquid crystal display apparatus by joining at least two said liquid crystal display elements so that a junction edge of one liquid crystal display element is adjacent a junction edge of an adjacent liquid crystal display element and display surfaces of said liquid crystal display elements are flush, wherein said zonal sealing member of each pair of adjacent liquid crystal display elements includes a sealing member portion on a side of the junction edge formed along a junction surface of said liquid crystal display elements, said sealing member portion having a width that is narrower than a width of said light shielding means between adjacent picture elements, and wherein said zonal sealing member is formed by adhesive photoresist.

6. A method for producing a liquid crystal display apparatus comprising the steps of:

the step of producing liquid crystal display elements having a plurality of picture elements, which are arranged in a matrix pattern so as to display images by transmitting/shielding a transmitting light according to an image signal, a net-like light shielding means surrounding each picture element so as to shield a light entering a position where the picture elements do not exist and a zonal sealing member, which is provided between substrates in order to seal liquid crystal in the liquid crystal display elements; and the step of obtaining said liquid crystal display apparatus by joining said plural liquid crystal display elements so that display surfaces of said liquid crystal display elements become flush, wherein the zonal sealing member provided in order to seal liquid crystal into said liquid crystal display elements includes the sealing member formed along a junction surface of the liquid crystal display elements, the sealing member along the junction surface having a width set narrower than a width of said light shielding means, wherein said liquid crystal picture elements are obtained by cutting said substrates by a dicing blade in its thickness-wise direction along the outside of the sealing member on the junction side, said dicing blade being set so that a width of the sealing member on the junction side, which has been formed inside said sealing member, facing the junction surface of the liquid crystal display elements becomes narrower than the width of said light shielding means.

* * * * *